(12) United States Patent　　　　(10) Patent No.: US 12,586,304 B2
　　Kanaya　　　　　　　　　　　　　(45) Date of Patent: Mar. 24, 2026

(54) PROGRAM, INFORMATION PROCESSING METHOD, AND INFORMATION PROCESSING SYSTEM

(71) Applicant: GREE HOLDINGS, INC., Tokyo (JP)

(72) Inventor: Yosuke Kanaya, Tokyo (JP)

(73) Assignee: GREE HOLDINGS, INC., Tokyo (JP)

( * ) Notice: Subject to any disclaimer, the term of this patent is extended or adjusted under 35 U.S.C. 154(b) by 161 days.

(21) Appl. No.: 18/215,845

(22) Filed: Jun. 29, 2023

(65) Prior Publication Data

US 2024/0212264 A1　　Jun. 27, 2024

(30) Foreign Application Priority Data

Dec. 26, 2022　　(JP) ................................. 2022-208596
May 11, 2023　　(JP) ................................. 2023-078488

(51) Int. Cl.
　　*G06T 17/00*　　　　(2006.01)
　　*G06F 3/04815*　　　(2022.01)
　　*G06F 3/04842*　　　(2022.01)
　　*G06T 7/70*　　　　 (2017.01)
(52) U.S. Cl.
　　CPC .......... *G06T 17/00* (2013.01); *G06F 3/04815*
　　　　(2013.01); *G06F 3/04842* (2013.01); *G06T*
　　　　　　　　　　　　　　　　　　　　*7/70* (2017.01)
(58) Field of Classification Search
　　CPC ........ G06T 17/00; G06T 7/70; G06F 3/04842
　　See application file for complete search history.

(56) References Cited

U.S. PATENT DOCUMENTS

| 2012/0210254 A1* | 8/2012 | Fukuchi ................. G06F 3/012 |
| | | 715/757 |
| 2016/0004692 A1* | 1/2016 | Rogowski ................ G09G 5/00 |
| | | 704/3 |
| 2016/0071496 A1* | 3/2016 | Jones .................. G06F 16/9537 |
| | | 345/636 |
| 2016/0306802 A1* | 10/2016 | Jung ..................... G06F 16/951 |
| 2017/0235968 A1* | 8/2017 | Kishi .................. G06F 16/5846 |
| | | 707/781 |
| 2020/0402099 A1* | 12/2020 | Pittman ............... H04L 67/1097 |

FOREIGN PATENT DOCUMENTS

JP　　　　2003-030121 A　　1/2003

* cited by examiner

*Primary Examiner* — Yi Yang
(74) *Attorney, Agent, or Firm* — XSENSUS LLP

(57)　　　　　ABSTRACT

An information processing system comprises processing circuitry configured to display a first user interface element on a screen of a virtual space, the first user interface element for starting an application browser; start the application browser in a case that an operation is performed on the first user interface element by a user; display a second user interface element which shares information displayed by the application browser; send a sharing request to a server in a case that an operation is performed on the second user interface element by the user, the sharing request being a request to share information displayed by the application browser with a device used by a different user viewing the screen of the virtual space; and display, as shared information, information displayed by the application browser on a display object disposed in the virtual space.

20 Claims, 17 Drawing Sheets

PROGRAM, INFORMATION PROCESSING METHOD, AND INFORMATION PROCESSING SYSTEM

CROSS-REFERENCE TO RELATED APPLICATIONS

The present application claims priority to Japanese Application No. 2022-208596, filed Dec. 26, 2022, and Japanese Application No. 2023-078488, filed May 11, 2023, the entire contents of both of which are incorporated by reference.

BACKGROUND

1. Technical Field

The present disclosure relates to a program, an information processing method, and an information processing system.

2. Description of the Related Art

Conventionally on a network platform, such as in social networking services, information sharing is conducted, that is, a user shares information posted on a website by another user. For example, a conventional web sharing system which includes a first communication terminal and a second communication terminal each having a web sharing application. The web sharing application displays a web sharing browser window. The web sharing browser window of the first communication terminal is related to the internet protocol (IP) address of the second communication terminal. The web sharing application of the first communication terminal displays a webpage of an input uniform resource locator (URL) in the web sharing browser window. The second communication terminal obtains the URL input into the first communication terminal and displays the webpage in the web sharing browser window of the second communication terminal.

SUMMARY

In an exemplary implementation of the present disclosure, an information processing system comprises processing circuitry configured to display a first user interface element on a screen of a virtual space, the first user interface element for starting an application browser; start the application browser in a case that an operation is performed on the first user interface element by a user; display a second user interface element which shares information displayed by the application browser; send a sharing request to a server in a case that an operation is performed on the second user interface element by the user, the sharing request being a request to share information displayed by the application browser with a device used by a different user viewing the screen of the virtual space; and display, as shared information, information displayed by the application browser on a display object disposed in the virtual space.

BRIEF DESCRIPTION OF THE DRAWINGS

FIG. 1 is a schematic view illustrating an information processing system according to a first embodiment;

FIG. 2 is a block diagram illustrating the hardware configuration of a device, such as a user device, according to the first embodiment;

DETAILED DESCRIPTION

Figure 3:
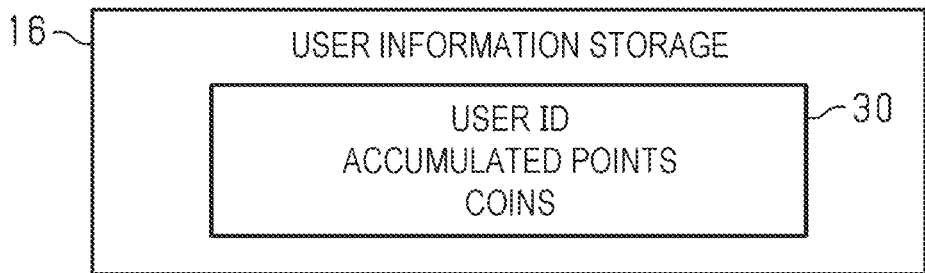
FIG. 3 is a schematic diagram illustrating user information used in the first embodiment.

The inventors have developed the technology of the present disclosure such that a web sharing system is used as a medium to allow a user to share information with another user to leave an impression on the user.

In accordance with the present disclosure, a program according to an aspect of the invention causes one or more computers to function as: a first display controller that displays a first user interface element on a screen of a virtual space, the first user interface element being used for starting an application browser; a starter that starts the application browser when an operation performed on the first user interface element by a user is received; a second display controller that displays a second user interface element used for sharing information displayed by the application browser; a sharing module that sends a sharing request to a server when an operation performed on the second user interface element by the user is received, the sharing request being a request to share information displayed by the application browser with a device used by a different user who is viewing the screen of the virtual space; and a third display controller that displays, as shared information, information displayed by the application browser on a display object disposed in the virtual space.

In accordance with the present disclosure, an information processing method according to an aspect of the invention is executed by one or more computers. The information processing method includes: first display control processing for displaying a first user interface element on a screen of a virtual space, the first user interface element being used for starting an application browser; starting processing for starting the application browser when an operation performed on the first user interface element by a user is received; second display control processing for displaying a second user interface element used for sharing information displayed by the application browser; sharing processing for sending a sharing request to a server when an operation performed on the second user interface element by the user is received, the sharing request being a request to share information displayed by the application browser with a device used by a different user who is viewing the screen of the virtual space; and third display control processing for displaying, as shared information, information displayed by the application browser on a display object disposed in the virtual space.

In accordance with the present disclosure, an information processing system according to an aspect of the invention includes a first display controller, a starter, a second display controller, a sharing module, and a third display controller. The first display controller displays a first user interface element on a screen of a virtual space. The first user interface element is used for starting an application browser. The starter starts the application browser when an operation performed on the first user interface element by a user is received. The second display controller displays a second user interface element used for sharing information displayed by the application browser. The sharing module sends a sharing request to a server when an operation performed on the second user interface element by the user is received. The sharing request is a request to share information displayed by the application browser with a device used by a different user who is viewing the screen of the virtual space. The third display controller displays, as shared information, information displayed by the application browser on a display object disposed in the virtual space.

In the present disclosure, "browser" includes at least one of an application browser and a web browser, which is installed separately from a program.

First Embodiment

A first embodiment of a program, an information processing method, and an information processing system will be described below.
(Information Processing System)

Figure 1:
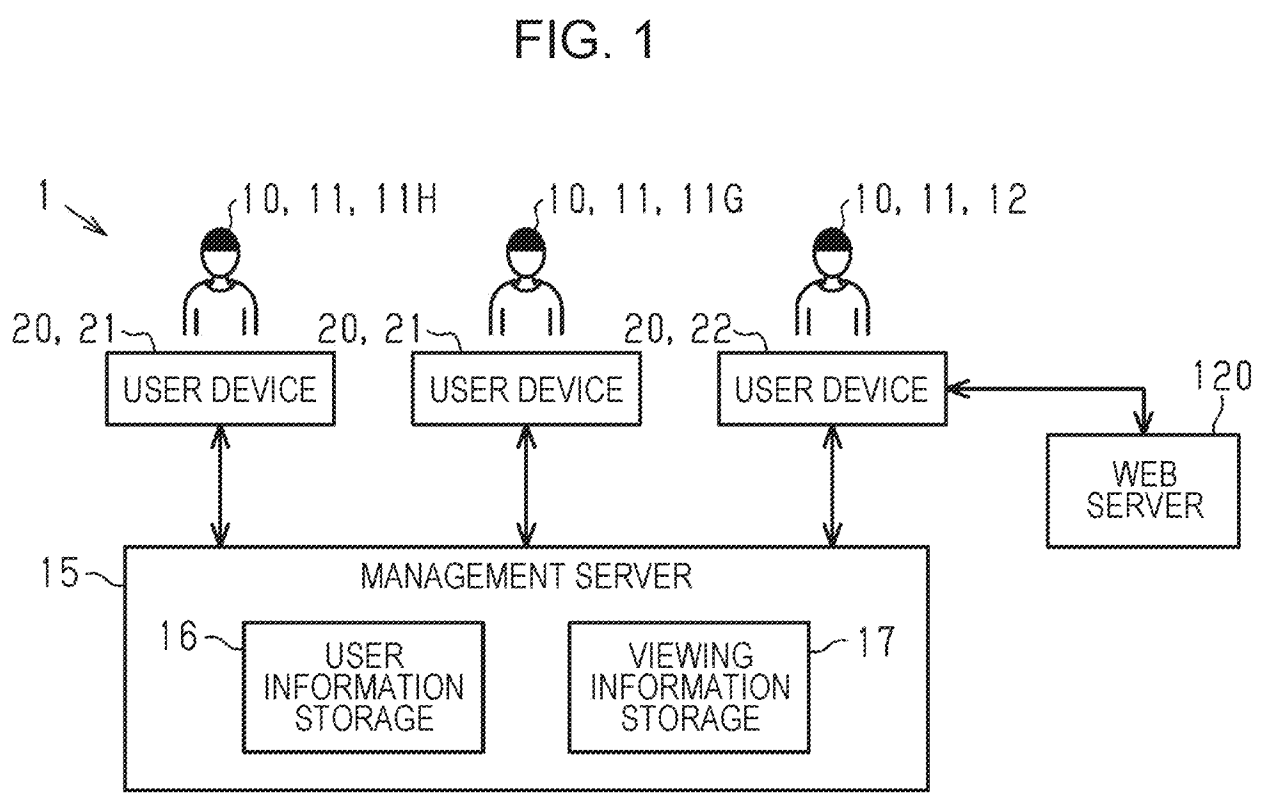

An information processing system 1 will be described below with reference to FIG. 1. The information processing system 1 includes a management server 15 and user devices 20. The management server 15 and the user devices 20 send and receive data via a network, such as the internet. In the first embodiment, the information processing system 1 is a system that allows a user 10 to stream video images of a virtual space by using the user device 20. The information processing system 1 provides a mobile space where the position of a user 10 in a virtual space can be changed. Hereinafter, the position of a user 10 in a virtual space will be called a virtual position. The mobile space is also called a world or a field. In response to an operation of a user 10, the user device 20 displays an image (video image) in a virtual space as seen from the virtual position.

The management server 15 can connect to the user device 20 via a network. The user device 20 is a device in which an application for streaming and viewing video images is installed. Alternatively, the user device 20 is a device used by a user 10 having registered in a video providing service for streaming and viewing video images. The management server 15 relays data concerning video streaming. The management server 15 includes a user information storage 16 and a viewing information storage 17.

A user 10 who performs video streaming by using its user device 20 will be called a streaming user 11. A user viewing video images broadcast by a streaming user 11 will be called a viewing user 12. The same user 10 can be a streaming user 11 and a viewing user 12. That is, when a user 10 performs video streaming, he/she is a streaming user 11, and when the user 10 views video images, he/she is a viewing user 12. A user device 20 used by a streaming user 11 will be called a streaming user device 21. A user device 20 used by a viewing user 12 will be called a viewing user device 22. In the first embodiment, a streaming user 11 and a viewing user 12 will simply be called a user 10 unless it is necessary to distinguish them from each other, and a streaming user device 21 and a viewing user device 22 will simply be called a user device 20 unless it is necessary to distinguish them from each other. In the first embodiment, a streaming user 11 is an information sharing party who shares information. If there are multiple streaming users 11, a streaming user 11 can be an information sharing subject who views information shared by another streaming user 11. A viewing user 12 is an information sharing subject who views shared information. Sharing of information can also be regarded as providing of information. An information sharing party can also be regarded as a provider who provides information.

Multiple users can perform video streaming in the same virtual space. This is called collaboration streaming. That is, the streaming user device 21 can perform collaboration streaming in which the virtual positions of multiple streaming users 11 are disposed in the same virtual space. Hereinafter, a streaming user 11 who sends a request to create a room, which is a virtual space to be shared by a group of the streaming user 11, will be called a host user 11H, while a streaming user 11 who participates in the room created by the host user 11H will be called a guest user 11G.

The management server 15 stores asset data of a mobile space. In a mobile space, multiple objects are set at predetermined positions. The management server 15 receives from the user device 20 of a user 10 a request to create a room and identification information on a mobile space specified by the user 10. The management server 15 then creates a room of the specified mobile space by setting the user 10 having sent the request to create a room as a host user 11H. For example, the management server 15 receives identification information on a room "shopping mall world" including objects, such as stores and products, and a request to create this room from the streaming user device 21 of the host user 11H. The management server 15 creates this room and also sends asset data of the room to the streaming user device 21 of the host user 11H.

In the first embodiment, a user 10 can participate in collaboration streaming as a guest user 11G by accepting a request to take part in a created room sent from a host user 11H. In this case, the host user 11H selects a user to participate in the room (hereinafter such a user will also be called a participant user) from a user list. The user list includes users who acknowledge the host user 11H and who are also acknowledged by the host user 11H. In response to the host user 11H performing an operation for a request to participate in the room (hereinafter such a request will also be called a participate request), the streaming user device 21 of the host user 11H sends identification information of a selected user 10 to the management server 15. The user device 20 of the selected user 10 receives the participate request via the management server 15. In response to the selected user 10 performing an operation for accepting the participate request, the user device 20 sends an acceptance reply to the management server 15. Upon receiving the acceptance reply from the user device 20, the management server 15 relates the identification information of the selected user 10 to the room. Then, the selected user 10 can become a guest user 11G.

Alternatively, a user 10 can participate in collaboration streaming as a guest user 11G as a result of the host user 11H approving a participate request sent from the user 10. In this case, the user device 20 of the user 10 receives an operation for selecting a room in which the user 10 wishes to participate from a list of rooms. The user device 20 then sends identification information of the selected room and a participate request to the management server 15. The management server 15 then sends a request to acknowledge the participate request to the streaming user device 21 of the host user 11H. The participate request is then displayed on the streaming user device 21. In response to the host user 11H performing an operation for approving the participate request, the streaming user device 21 sends approval information to the management server 15. Upon receiving the approval information from the streaming user device 21, the management server 15 relates the identification information of the user 10 having sent the participate request to the room. Then, the user 10 can become a guest user 11G.

A viewing user 12 selects video (room) that the viewing user 12 wishes to view from a video list screen displayed by the application installed in the user device 20 or from a video list screen of a website of the video providing service in which the viewing user 12 has registered. Then, the viewing user 12 can start viewing the selected video. The viewing user device 22 receives data, such as drawing data, required for displaying video images from the management server 15 without getting permission from the streaming user 11.

(Hardware Configuration)

The hardware configuration of the user device 20 will be discussed below with reference to FIG. 2. The user device 20 is a smartphone (multifunction phone terminal), a tablet terminal, a personal computer, a console game machine, a wearable computer, or another type of information processing device that can play back video images. The wearable computer may be of any type if it includes a screen that a user 10 can view video images. For example, the wearable computer is a head-mounted display worn on the head of a user 10 or a glasses-type wearable terminal. The user device 20 is constituted by a single unit which operates solely. Alternatively, the user device 20 is constituted by multiple units connected to each other to send and receive various types of data with each other. An example of the user device 20 constituted by multiple units is an outside-in tracking system.

Figure 2:
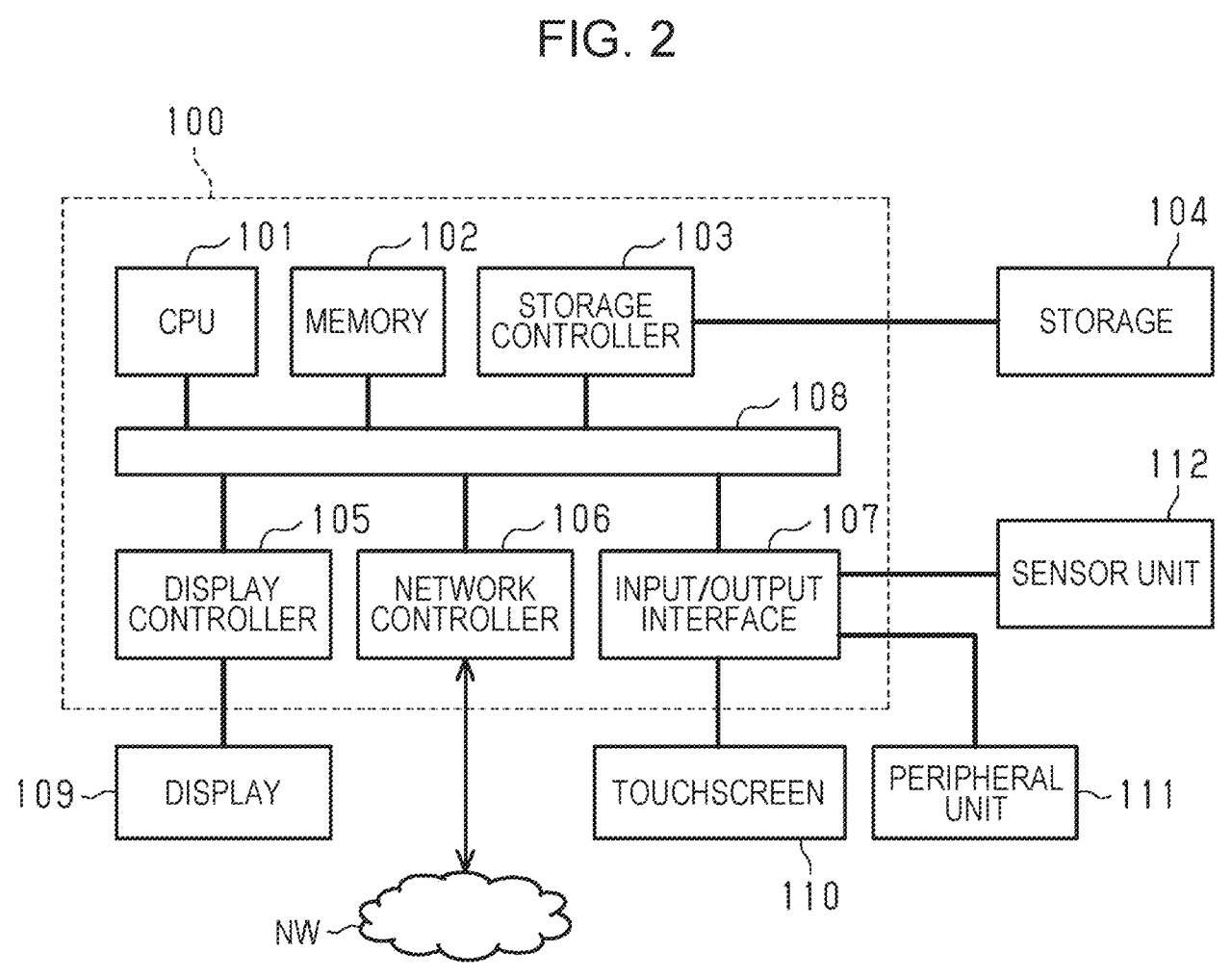

The example in FIG. 2 illustrates the configuration of a user device 20 including a sensor unit 112 for detecting the action of a streaming user 11. The sensor unit 112 may be a device separately provided from the user device 20 and connect to the user device 20 to communicate with it.

The user device 20 includes a processing circuit 100, a storage 104, the sensor unit 112, a display 109, a touchscreen 110, and a peripheral unit 111.

The processing circuit 100 includes a central processing unit (CPU) 101 and a memory 102. The CPU 101 is a processor that executes one or more control processes disclosed in the specification. Processing data and instructions may be stored in the memory 102. The processing data and instructions may alternatively be stored in the storage 104, which is a storage medium disk, such as a hard disk drive (HDD) or a portable storage medium, or may be stored in a storage medium separately provided from the processing circuit 100. The storage 104 is connected to the CPU 101 via a bus 108 and a storage controller 103. In the first embodiment, the application is stored in the storage 104. The application includes a program for streaming and viewing video images and various types of data required for executing the program.

The functions disclosed in the specification can be implemented by various devices other than the CPU 101, such as those configured or programmed to execute the disclosed functions. Examples of such devices are a general-purpose processor, a special-purpose processor, an integrated circuit, an application specific integrated circuit (ASIC), a known circuit, processing circuitry and/or a circuit including a combination thereof. The processor contains a transistor and another circuit and is thus a processing circuit or a circuit. The processor may be a processor programmed to execute a program stored in a memory. In the present disclosure, the processing circuit, units, such as the display controller 105, or mediums are hardware devices that execute the disclosed functions or that are programmed to execute the disclosed functions. The hardware devices may be certain hardware devices that are programmed or configured to execute functions disclosed in the specification or existing functions.

The processor is not restricted by the type of computer readable medium in which process instructions are stored. For example, the process instructions may be stored in a compact disc (CD), a digital versatile disc (DVD), an element of an information processing device, such as a flash memory, a random access memory (RAM), a read only memory (ROM), a programmable ROM (PROM), an erasable programmable read only memory (EPROM), an electrically EPROM (EEPROM), or a hard disk, with which the processing circuit 100 communicates, or another non-transitory computer readable medium, such as that in a server or a computer. The processes may be stored in a network-based storage, a cloud-based storage, or another mobile accessible storage and be executed by the processing circuit 100.

It can be understood that a description or a block in the flowcharts disclosed in the specification represents a mode, a segment, or a portion of a code including one or more executable instructions for implementing a specific logic function or step in a process. The descriptions or blocks can be executed in order different from those illustrated in the drawings or described in the specification. For example, they may be executed substantially simultaneously or in a reversed order.

The hardware elements of the processing circuit 100 can be implemented by processing circuitry and/or various circuit elements. Each function in the embodiments may be implemented by a circuit including one or more processing circuits.

The processing circuit 100 also includes a network controller 106 for connecting to a network NW. The network NW is a public network, such as the internet, a private network, such as a local area network (LAN) or a wide area network (WAN), or any combination thereof. The network NW may include the public switched telephone network (PSTN), integrated services digital network (ISDN) (registered trademark), or a subnetwork. The network NW may be a wired network, such as an Ethernet network (registered trademark) or a universal serial bus (USB) cable. The network NW may be a wireless network, such as a cellular network including 3G, 4G, and 5G cellular systems. The wireless network may be Wi-Fi (registered trademark), a wireless LAN, Bluetooth (registered trademark), or another known wireless communication form. The network controller 106 is compliant with other direct communication standards, such as Bluetooth (registered trademark), near field communication (NFC), and infrared.

The processing circuit 100 also includes a display controller 105 and an input/output interface 107. The display controller 105 and the input/output interface 107 are connected to the bus 108. The display controller 105 is connected to the display 109. The input/output interface 107 is connected to the touchscreen 110 and the peripheral unit 111.

The sensor unit 112 will be explained below. The sensor unit 112 is constituted by one or more sensors for detecting face motion and body motion. The face motion indicates a change in the expression of a user. The body motion indicates a change in the relative position of a user body based on the sensor unit 112. The face motion includes the face movement of a user, such as eye blinking and mouth opening and closing. As the sensor unit 112, a known sensor may be used. The sensor unit 112 includes a sensor for measuring the distance to a measurement subject by irradiating the measurement subject with light. For example, a true depth sensor or a LIDAR (light detecting and ranging or laser imaging detection and ranging) may be used. In this case, for example, light-emitting section of the sensor unit 112 projects tens of thousands of invisible dots onto a user face by using a dot projector. The light-emitting section then detects and analyzes light reflected by the measurement subject as a dot pattern so as to form a depth map of the user face. Then, the light-emitting section captures an infrared image of the user face so as to generate precise face data. The operation processor of the sensor unit 112 generates various items of information based on the depth map and the infrared image and compares the generated items of information with registered reference data, thereby calculating the depth of each point of the face (the distance between each point and a near infrared camera) and a difference between the position of each point and the corresponding points indicated by the registered reference data. As another example of the sensor unit 112, a ranging method other than the above-described method may be employed. For example, the sensor unit 112 includes at least one of a time of flight (ToF) sensor, a camera for capturing a user face, and an image processor for executing image processing on data captured by the camera. The ToF sensor measures the time from when light is applied to a user until when light is reflected by and returned from a measurement subject, such as the face of the user, or measures the phase difference of light returned from the measurement subject. In this manner, the ToF sensor measures the distance to the measurement subject based on the time of flight or the phase difference.

The sensor unit 112 outputs the detected face motion and body motion to the processing circuit 100 as tracking data. The tracking data is part of motion data. The motion data is data in general for moving an avatar object. For example, the motion data includes, as well as tracking data, data for causing an avatar object to make a predetermined registered action, such as "applaud". Hereinafter, the registered action of an avatar object will be called "emote", and data for causing an avatar object to make an emote action will be called emote data.

The sensor unit 112 may have a hand tracking function as well as a face tracking function. The sensor unit 112 may also include a sensor for detecting the position or the orientation of a human part other than the hand. The sensor unit 112 may also include a sensor for detecting the velocity and acceleration and/or a sensor for detecting the direction and orientation (such as a gyroscope). The sensor unit 112 may have a spatial mapping function of recognizing objects in a real space where a user is positioned, based on the detection results of the above-described various sensors, and of mapping the recognized objects onto a spatial map.

The peripheral unit 111 includes a microphone and a speaker. The peripheral unit 111 may be operation buttons provided on a casing of the user device 20, a keyboard, a mouse, or a controller operated by a user. The controller may contain various known sensors, for example, inertial measurement units (IMUs), such as an acceleration sensor and a gyroscope. Another example of the peripheral unit 111 is a tracking unit for specifying the movement of the user hand, eyes, and head and/or the user gaze direction. If the peripheral unit 111 is a tracking unit of this type, the user device 20 can determine the content of a user instruction based on the movement of the hand of the user, for example, and execute various operations, such as starting or finishing video streaming, sending a message or rating video, and displaying a predetermined object. If the user device 20 includes an input unit, such as a mouse or a controller, as the peripheral unit 111, the provision of the touchscreen 110 may be omitted. If the user device 20 includes the touchscreen 110, the input unit, such as a mouse or a controller, may be omitted.

The management server 15 includes a processing circuit 100 configured similarly to that of the user device 20. For the management server 15, the provision of some elements, such as the sensor unit 112, peripheral unit 111 (a speaker and a microphone, for example), and display 109, may be omitted.

The video application installed in the storage 104 will be explained below. The video application includes a native component installed in the user device 20. The native component is operated on an operating system (OS) of the user device 20 and can access resources of the user device 20, such as the storage 104. The native component functions to display video images on the display 109, based on drawing data received from the management server 15.

In one mode, the video application contains an application browser. The application browser is a component for implementing a browser function, such as WebView, included in the video application. WebView is a browser function built in the video application and is an application programming interface (API), such as SFSafariView or WKWebView. The application browser includes an analyzer and a display controller. As in an independent web browser, the application browser displays obtained web data on a screen and executes JavaScript (registered trademark) by analyzing a hypertext markup language (HTML) or cascading style sheets (CSS). The web data is data, such as an HTML file, required for displaying a screen on the display 109 using the application browser. The web data is constituted by one or more files. For example, the web data is a file described in a markup language, such as HTML or JavaScript (registered trademark), a CSS file, or an external file described in JavaScript (registered trademark). The application browser requests a web server 120 (see FIG. 1), which is an external server, or the management server 15 to send web data corresponding to a specified uniform resource locator (URL). The application browser then obtains the web data from the web server 120 or the management server 15.

If the received web data is HTML data, the analyzer of the application browser analyzes the HTML data. If the received web data includes image data in the joint photographic experts group (JPEG) format, graphics interchange format (GIF) format, or portable network graphics (PNG) format, the analyzer causes the display processor of the application browser to execute display processing.

In another mode, in response to a predetermined input operation from a user, a web browser installed in the user device 20 separately from the video application may be started. In the first embodiment, a description will be given, assuming that the video application includes an application browser. A description will also be given by distinguishing the application browser from a web browser installed in the user device 20 separately from the application browser. Hereinafter, when at least one of the application browser and a web browser is included in the user device 20, it will simply be called a browser.

(Data Configuration)

User information 30 and viewing information 31 will be explained below with reference to FIGS. 3 and 4, respectively.

FIG. 3 illustrates an example of the user information 30 recorded on the user information storage 16 of the management server 15. The user information 30 is recorded for each user. Examples of the user information 30 are a user ID (identifier), which is user identification information, accumulated points, and coins. The accumulated points are points given to a user in exchange for activities concerning video, such as video streaming and viewing, and accumulated for each user. The coins are virtual money purchased by a user. The coins can be used on the application or a platform providing the application in exchange for items, gift objects, or parts of avatar objects.

Figure 4:
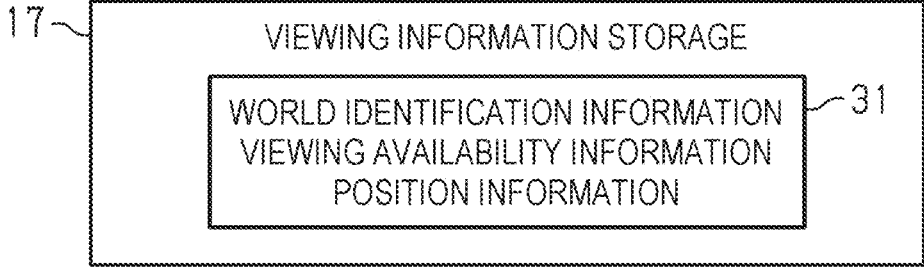
FIG. 4 is a schematic diagram illustrating viewing information used in the first embodiment.

FIG. 4 illustrates an example of the viewing information 31 recorded on the viewing information storage 17 of the management server 15. The viewing information 31 is information that can be displayed using the application browser of the user device 20. The viewing information 31 includes world identification information, viewing availability information, and position information. The world identification information indicates the name or the identifier of a mobile space (world) in which the viewing information is displayed. The viewing availability information is a URL or a domain, for example, of a website that a user is allowed to view with the application browser. For example, the URL of the top page of an electronic commerce (EC) site which sells products, such as clothes, fashion accessories, and electrical appliances, may be linked with the world identification information of the mobile space "shopping mall world". The products in the EC site may be those distributed in the real world and usable by the user 10 in the real world. Alternatively, the products may be those usable in a virtual space, such as items that can be worn by avatar objects. The products that can be used in a virtual space may be those purchased and used only in the virtual space.

The position information is recorded if the viewing information to be displayed by the application browser is changed in accordance with the position of the viewing information in a mobile space. For example, in "shopping mall world", the webpage of an EC site selling clothes is displayed in or around a virtual store which sells clothes. The webpage of an EC site selling furniture is displayed in or around a virtual store which sells furniture. In this case, the coordinate range of the mobile space is recorded in association with the viewing availability information.

(Functions of User Device)

Figure 5:
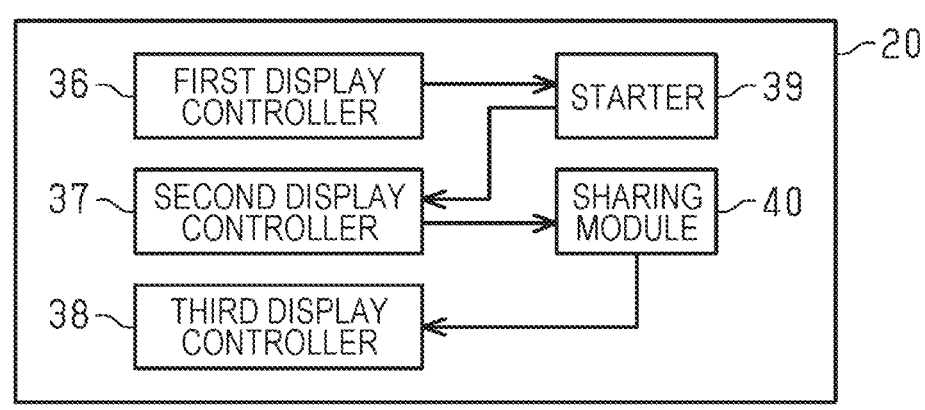
FIG. 5 is a block diagram illustrating the functions of a user device according to the first embodiment.

The individual functions of the user device 20 will be discussed below with reference to FIG. 5. The processing circuit 100 of the user device 20 functions as a first display controller 36, a second display controller 37, a third display controller 38, a starter 39, and a sharing module 40 as a result of executing a program.

The first display controller 36 displays a first user interface (UI) element, which is used for starting the application browser, on a screen which displays a virtual space. The first UI element is a character string, a graphical user interface (GUI), such as a button, an image element displayed on a screen of the application browser, or an object located in a virtual space. Such elements are linked with a destination URL.

The second display controller 37 displays a second UI element used for sharing information displayed by the application browser. In the first embodiment, the first display controller 36 and the second display controller 37 function only in a video streaming mode.

The third display controller 38 displays, as shared information, information displayed by the application browser on a display object disposed in a virtual space. The shared information is information displayed by the application browser in the user device 20 of a user 10 and is information that the user 10 wishes to share and has sent a sharing request. The shared information may be information that another user 10 wishes to share and sends a sharing request.

The starter 39 starts the application browser only when an operation performed on the first UI element by the user 10 is received. In the first embodiment, the starter 39 starts the application browser only in the video streaming mode. The application browser obtains web data linked with the first UI element and displays a screen based on the web data.

The sharing module 40 sends a sharing request to the management server 15 when an operation performed on the second UI element by the user 10 is received. The sharing request is a request to share information displayed by the application browser with a user device 20 used by another user 10 (device used by a different user) who is viewing the screen of the virtual space. In the first embodiment, the sharing module 40 sends a sharing request to the management server 15 only in the video streaming mode.

The function of the third display controller 38 will be discussed below in detail with reference to FIG. 6. In a mobile space 73, regular objects 50 and avatar objects 60 are disposed. In the example in FIG. 6, the regular objects 50 are objects other than the avatar objects 60 corresponding to streaming users 11. In the mobile space 73, a world coordinate system (X, Y, Z) is set. In the regular objects 50, an object coordinate system (x, y, z) is set.

In the mobile space 73, one or more display objects 51 are disposed. The display object 51 is an example of the regular object 50. The display object 51 can display shared information 55 shared by a streaming user 11. In the first embodiment, the shared information 55 is an image, such as a still image in the JPEG, GIF, or PNG format, or a video image based on video data in the MPEG-4 format, for example.

Figure 6:
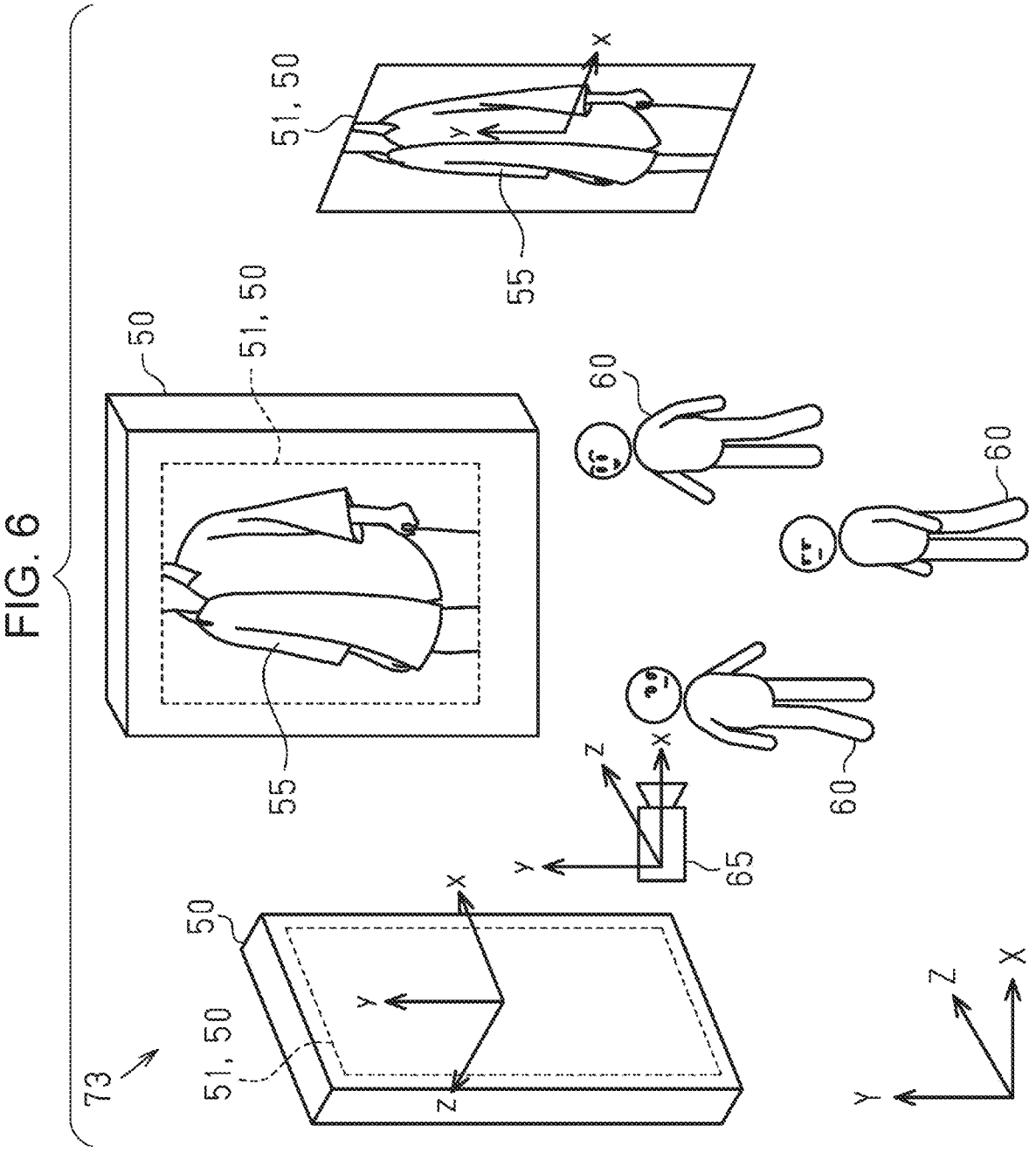
FIG. 6 is a schematic view for explaining drawing processing for display objects and avatar objects executed in the first embodiment.

In the example in FIG. 6, the display object 51 is an object constituted by a two-dimensional flat object without thickness. In another example, the display object 51 may be a two-dimensional or three-dimensional uneven object having a thickness. The display object 51 may be disposed in a three-dimensional virtual space, such as in the mobile space 73. The two-dimensional display object 51 may be set in relation to a three-dimensional regular object 50 as in a parent-child relationship, as indicated on the left side of FIG. 6. In this case, the display object 51 follows the movement of the regular object 50. Alternatively, the display object 51 may be set alone in the mobile space 73, as indicated on the right side of FIG. 6.

The display object 51 or a set of the display object 51 and the related regular object 50 is displayed as a digital signage, a display, a screen, or a mobile body, such as an automobile or an airship, for example.

The third display controller 38 projects, as the shared information 55, an image based on web data displayed by the application browser onto the display object 51 by using a technique such as texture mapping. The third display controller 38 may process the web data to generate an image to be projected on the display object 51. For example, the third display controller 38 may extract image elements displayed on a browser screen when the second UI element 72 is operated. The image elements are data elements embedded in the web data and are image data in the JPEG, GIF, or PNG format, for example. Alternatively, the image elements are image data for displaying video images in the MPEG-4, audio video interleave (AVI), MOV, or flash video (FLV) format, for example. The third display controller 38 may extract image elements having the highest priority from the web data. In this case, the third display controller 38 extracts image elements having the highest priority from image data embedded in the web data. Alternatively, the third display controller 38 may capture a screen displayed on the browser screen and obtain the resulting image.

If multiple display objects 51 are located in the mobile space 73, the third display controller 38 simultaneously displays the shared information 55 on all the display objects 51. Alternatively, the third display controller 38 may display the shared information 55 on the display objects 51 at different timings.

The object coordinate system is set for an avatar object 60. In the mobile space 73, a virtual camera 65 corresponding to each streaming user 11 is also disposed. The virtual camera 65 is related to an avatar object 60. When the avatar object 60 moves by walking or running based on the operation of the streaming user 11, the virtual camera 65 follows the movement of the avatar object 60. In another example, the virtual camera 65 may be a fixed-point camera fixed at a certain position. Although only one virtual camera 65 is shown in FIG. 6 for the sake of convenience, if three streaming users 11 are participating in collaboration streaming, three virtual cameras 65 are set.

The third display controller 38 performs rendering to generate an image within a predetermined viewing range around the optical axis of the virtual camera 65. The third display controller 38 then outputs the mobile space 73 to the display 109 as an image seen from the virtual camera 65. "Rendering" in the first embodiment refers to drawing processing including operations, such as obtaining the position of a virtual camera, perspective projection, and hidden surface removal based on the depth information related to each object. Rendering may be processing including at least one of these operations or may be processing also including shading and texture mapping.

The position of the virtual camera 65 can be changed by the streaming user 11. For example, the streaming user 11 can select a first person viewpoint (avatar position) or a third person viewpoint as the position of the virtual camera 65. When the first person viewpoint is selected, rendering is performed in a state in which the position of the eyes of the avatar and the position of the virtual camera 65 match or substantially match each other. In this case, the line of sight of the avatar object 60 and the optical axis of the virtual camera 65 substantially match each other. Then, the image of the mobile space 73 seen from the avatar object 60 is displayed on the display 109. When the third person viewpoint is selected, the virtual camera 65 is set at a position in the vicinity of the avatar object 60 and rendering is performed so that the avatar object 60 is positioned at the center of the screen. When the virtual camera 65 is set at the third person viewpoint, an image of the avatar object 60 can be displayed on the screen. The streaming user device 21 may be able to change the position of the virtual camera 65 set at the third person viewpoint. Alternatively, the streaming user device 21 may generate an image by using a multi-viewpoint camera that can select one or more of multiple virtual cameras 65 located at three or more positions.

(Video Streaming and Viewing Method)

A video streaming and/or viewing method will now be described below. As the video streaming and/or viewing method, client rendering, browser rendering, video streaming, or server streaming, may be employed.

In client rendering, each user device 20 performs rendering of an object by executing a program. The user device 20 receives drawing data for displaying video images from the management server 15. The drawing data is data used for performing rendering of the image of a virtual space including objects. The drawing data includes at least motion data. The user device 20 draws avatar objects 60 by using data such as the motion data. In client rendering, data, such as model data of the avatar objects 60, is recorded on the storage 104 of the user device 20.

In browser rendering, a streaming user device 21 and a viewing user device 22 each display video images by using a web browser stored in the storage 104. The streaming user device 21 sends data, such as drawing data, to the management server 15. The user device 20 to display video images receives a webpage described in a markup language, such as HTML, and using CSS or JavaScript (registered trademark) from the management server 15. A web browser program started in the user device 20 draws avatar objects and other objects by using JavaScript operating on the browser. In browser rendering, the user device 20 records data, such as the URL of a webpage for displaying video images, on the storage 104. That is, data, such as model data of the avatar objects, is not stored in the user device 20. In browser rendering, the application may not necessarily be installed in the user device 20. Yet, the application including an application browser may be installed in the user device 20.

In video streaming, a streaming user device 21 generates video data. More specifically, the streaming user device 21 of a host user 11H draws objects by using motion data and other data to generate video data. The streaming user device 21 sends encoded video data and sound data to the management server 15. The management server 15 then sends the video data and sound data to a viewing user device 22. The viewing user device 22 then displays on the display 109 a video image based on the video data received from the streaming user device 21 via the management server 15.

In server streaming, the management server 15 generates video data. The management server 15 receives motion data and sound data from a streaming user device 21 and generates video data based on the received motion data and sound data. The management server 15 then sends the generated video data to the streaming user device 21 and a viewing user device 22. The streaming user device 21 and the viewing user device 22 output video images to the display 109 based on the received video data.

As described above, one of the user device 20 and the management server 15 takes charge of generating video data. The device to take charge of generating video data can be changed in accordance with the streaming method.

A streaming user device 21 and a viewing user device 22 may display video images by using different methods. For example, the streaming user device 21 may display video images using client rendering, while the viewing user device 22 may display video images using browser rendering. The method for displaying video images may be selected by a user 10. For example, some viewing user devices 22 may display video images using client rendering, while the remaining viewing user devices 22 may display video images using browser rendering.

In the first embodiment, client rendering, which is one of the above-described video streaming methods, in which each user device 20 performs rendering by executing a program will be discussed below in detail.

As described above, the storage 104 stores data such as three-dimensional model data of avatar objects and other objects. The three-dimensional data is data recorded on the storage 104 when a video application program is installed in the user device 20, data received from the management server 15, or a combination thereof.

The three-dimensional data of an avatar object will be discussed below. This three-dimensional data includes drawing data of body parts forming the body of the avatar object and attach parts that can be attached to the avatar object. A body part forms a part of the avatar object. Data for drawing the body parts includes polygon data, bone data for expressing the action of the avatar object, and texture data. At least some of the body parts can be set by a user as desired. That is, the user can determine the height and the body type of the avatar object as desired. The attach parts include data, such as texture data. A streaming user 11 can select his/her favorite parts as the attach parts of the avatar object representing the streaming user 11.

Model data of regular objects 50 including display objects 51 include data on objects, such as buildings, walls, pillars, windows, furniture, digital signages (electronic signages), screens, and mobile bodies, such as automobiles or airships. Data on the regular objects 50 include polygon data and texture data, for example.

A preparation step for video streaming and video viewing will be described below. A streaming user device 21 sends identification information of parts (part IDs) of an avatar object to the management server 15 as drawing data. As discussed above, the drawing data is data used for performing rendering of a virtual space including objects. The management server 15 then sends the identification information of parts of the avatar object to another user device 20 (device used by a different user). Upon receiving the identification information of the parts, the user device 20 draws the avatar object of the streaming user 11 based on the identification information.

Steps of video streaming and video viewing will be discussed below. The streaming user device 21 sends identification information of a room, user ID, and drawing data to the management server 15. The drawing data includes motion data and coordinate data indicating the virtual position. The streaming user device 21 also sends sound data of sound collected by the microphone to the management server 15. The management server 15 sends the received drawing data to the streaming user device 21 of another streaming user 11 participating in the room or to the viewing user device 22 of a viewing user 12 viewing the video images. The motion data, coordinate data, and sound data are appended with a timestamp. The timestamp is generated based on reference time information of the processing circuit 100 having a timing function. Alternatively, the timestamp is generated based on the reference time information sent from the management server 15 or that obtained from an external server. The timestamp may be a clock time or a time elapsed from a reference time.

The third display controller 38 of the viewing user device 22 receives the drawing data, user ID, and sound data from the management server 15. The third display controller 38 then draws the avatar object represented by the user ID by using the drawing data. The third display controller 38 also moves the avatar object by using the motion data.

The third display controller 38 also receives data of a message posted by another user, for example, from the management server 15. The third display controller 38 then combines the image generated by the rendering of avatar objects and other objects and posted messages and notifications and outputs the resulting video data to the display 109. The third display controller 38 also outputs the sound data in synchronization with the video data, based on the timestamps.

(Operation)

The operation to be executed by a streaming user device 21 when performing video streaming will be described below with reference to FIG. 7.

The streaming user device 21 and a viewing user device 22 receive asset data of the mobile space 73 from the management server 15. The asset data includes model data for drawing each object in the mobile space 73, background data, and viewing information 31 related to the first UI element. Based on the operation of the streaming user 11, the third display controller 38 moves the avatar object 60 and also displays on the display 109 a virtual space image of a region specified by the streaming user 11 within the mobile space 73.

The first display controller 36 of the streaming user device 21 displays the first UI element on the screen of the virtual space. In the first embodiment, the first UI element is displayed only by the streaming user device 21. In other words, the viewing user device 22 does not display the first UI element.

In step S1, the first display controller 36 receives an operation performed on the first UI element. Then, in step S2, the starter 39 starts the application browser. In step S3, the application browser displays a screen based on web data. More specifically, the application browser obtains the URL, which is viewing availability information related to the first UI element, and then requests the web server 120, which provides the web data of the URL, to send the web data. Upon receiving the web data, the application browser analyzes the web data and displays it. If position information is recorded in the viewing information 31, the application browser obtains the URL corresponding to the coordinate range containing the virtual position of the streaming user 11.

The second display controller 37 displays the second UI element. The second UI element is displayed only by the streaming user device 21 which has displayed the web data by using the application browser. In other words, the viewing user device 22 does not display the second UI element.

In step S4, the second display controller 37 receives an operation performed on the second UI element by the streaming user 11. Then, in step S5, the sharing module 40 sends a sharing request to the management server 15. The sharing request includes the URL of the web data displayed by the application browser, identification information of a room, and user ID.

Upon receiving the sharing request, the management server 15 sends sharing instruction information to the streaming user device 21 of another streaming user 11 participating in the room and to the viewing user device 22 of a viewing user 12 viewing the video image in the room. The sharing instruction information contains the URL included in the sharing request. The sharing instruction information may also include the user ID or the account name.

In step S6, the third display controller 38 displays shared information 55 based on the webpage, which is the subject to be shared included in the sharing request, on the corresponding display object 51 displayed on the user device 20. More specifically, if a display object 51 is included in the viewing range of the virtual camera 65 corresponding to the streaming user 11, the third display controller 38 projects an image generated based on the webpage onto the display object 51.

When the shared information 55 is displayed on the display object 51, the starter 39 may automatically close the application browser. Alternatively, the starter 39 may remain the application browser displayed unless the user 10 performs an operation for closing the application browser.

When receiving new sharing instruction information, the third display controller 38 deletes the shared information 55 which has been displayed. The starter 39 outputs the URL included in the new sharing instruction information to the application browser. The application browser then obtains web data based on the received URL. In response to the receiving of an operation performed on the second UI element 72, the third display controller 38 displays an image based on the obtained web data on the display object 51. The third display controller 38 repeats display processing on the display object 51 until video streaming is finished.
(Display of Screens)

Screens displayed by a streaming user device 21 will be explained below with reference to FIGS. 8 through 11. The screens shown in FIGS. 8 through 11 are those when the virtual camera 65 is positioned at the first person viewpoint.

Figure 8:
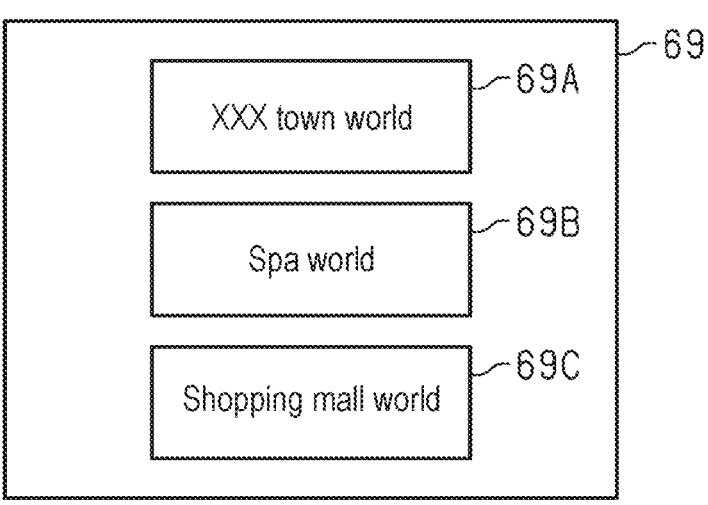
FIG. 8 illustrates a screen displayed on a user device according to the first embodiment.

FIG. 8 illustrates a world selection screen 69 displayed by using the application. The world selection screen 69 includes selectors 69A, 69B, and 69C (banners) corresponding to multiple mobile spaces 73. When one of the selectors 69A, 69B, and 69C is selected, the third display controller 38 sends a streaming start request to the management server 15. Upon receiving the streaming start request, the management server 15 sets the user 10 having sent the streaming start request to be a host user 11H and generates a room. The management server 15 also sends asset data to the streaming user device 21 of the host user 11H.

Figure 9:
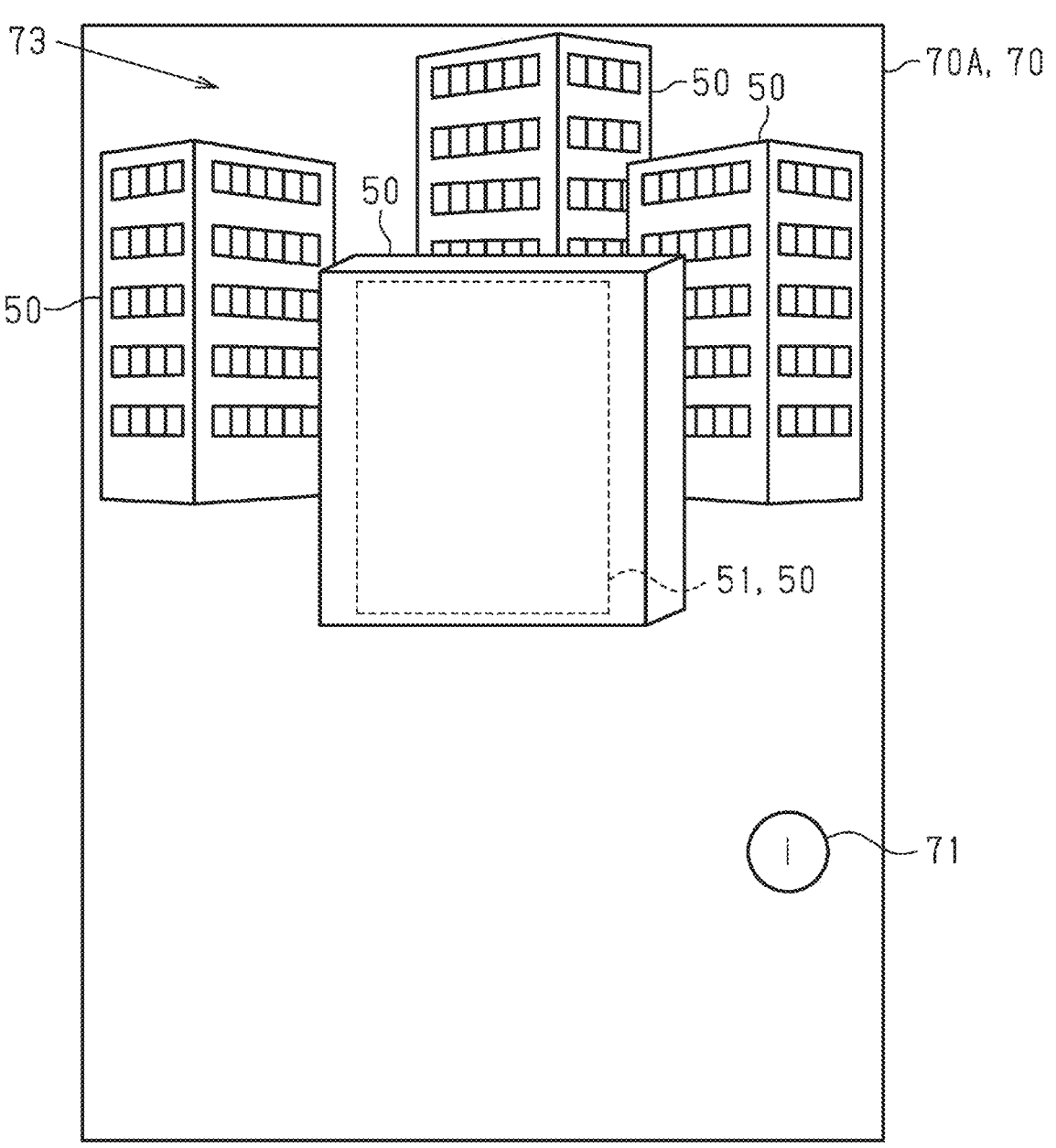
FIG. 9 illustrates a screen displayed on a user device according to the first embodiment.
Figure 10:
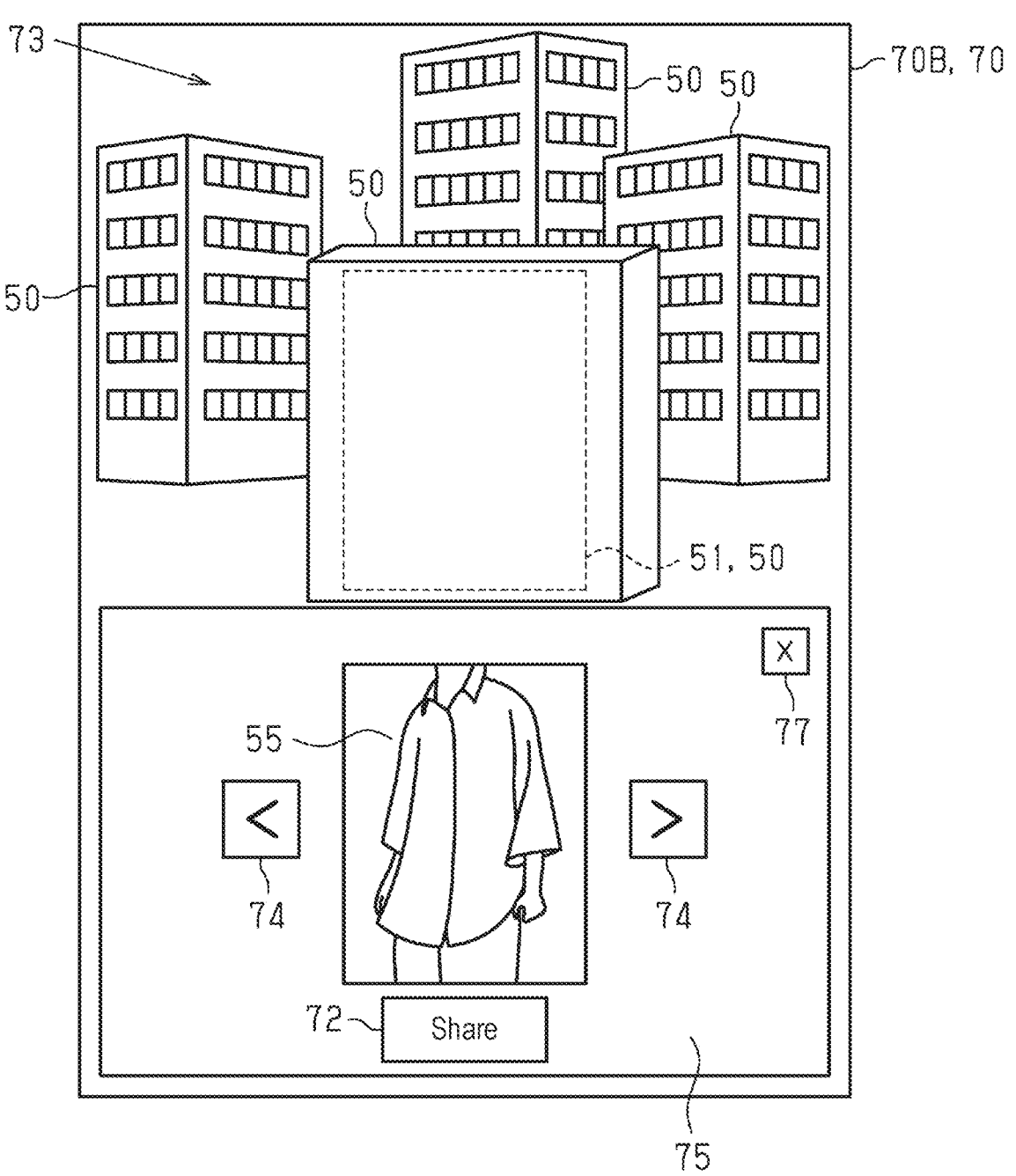
FIG. 10 illustrates a screen displayed on a user device according to the first embodiment.
Figure 11:
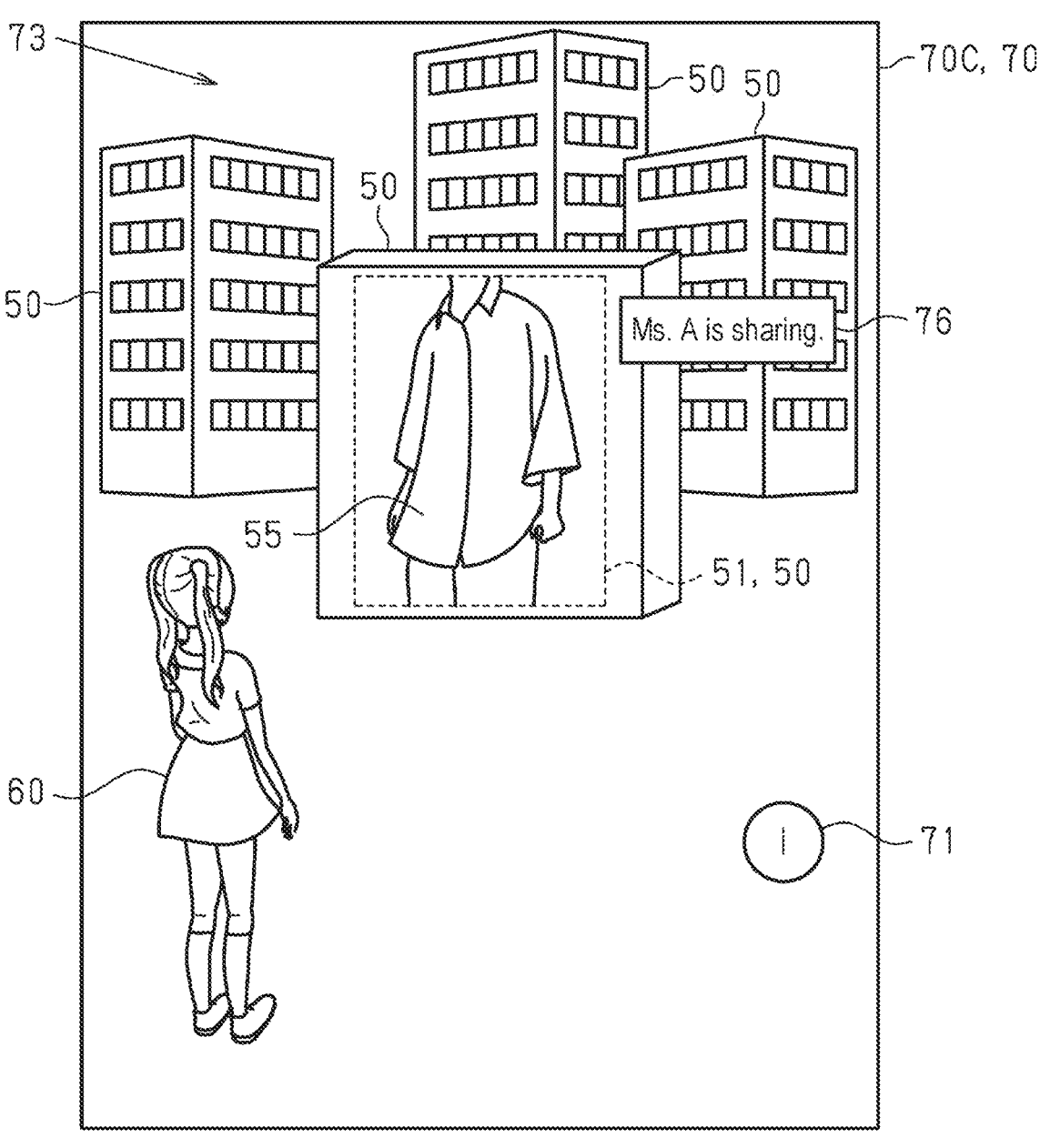
FIG. 11 illustrates a screen displayed on a user device according to the first embodiment.

As illustrated in FIGS. 9 through 11, the third display controller 38 displays a virtual space screen 70 by using the asset data. More specifically, the third display controller 38 displays regular objects 50 based on the asset data. The third display controller 38 also displays an avatar object 60 (see FIG. 11) of another streaming user 11 by using drawing data sent from the streaming user device 21 of this streaming user 11.

FIG. 9 illustrates a virtual space screen 70A including a first UI element 71. The third display controller 38 displays the virtual space screen 70A corresponding to the viewing range of the virtual camera 65. In the example in FIG. 9, the display object 51 and the regular objects 50 are contained in the viewing range of the virtual camera 65. The display object 51 is a digital signage, for example.

The first UI element 71 is a button showing an icon (design pattern), for example. Alternatively, the first UI element 71 may be a display object 51 or a regular object 50 associated with the display object 51. The display mode of the regular object 50 as the first UI element 71 may be changed in response to the operation, such as clicking, tapping, and swiping, performed by the streaming user 11.

FIG. 10 illustrates a virtual space screen 70B displayed after the first UI element 71 is operated. The starter 39 starts the application browser. The application browser displays a browser screen 75 in a display mode in which the browser screen 75 is superimposed on or embedded in the virtual space screen 70B. In the first embodiment, the browser screen 75 displayed by the streaming user device 21 is not displayed on any viewing user device 22.

The second display controller 37 displays the second UI element 72. The second UI element 72 is a GUI element, such as a button. Alternatively, an image element contained in the browser screen 75 may be set as the second UI element 72. In this case, the image element selected by the streaming user 11 is displayed on the display object 51 as shared information 55. Alternatively, the second UI element 72 may be the display object 51 or a regular object 50 associated with the display object 51. In this case, when the display object 51 or the regular object 50 is selected, the shared information 55 is displayed on the selected object.

The streaming user 11 performs an operation, such as clicking, tapping, or swiping, on the second UI element 72. For example, the streaming user 11 may swipe an image element that he/she wishes to share to move it toward the display object 51. The second display controller 37 displays the second UI element 72 in or on the browser screen 75. The second display controller 37 may alternatively display the second UI element 72 near the browser screen 75.

The application browser may display on the browser screen 75 a button 77, which is a UI element for closing the browser screen 75, and selectors 74 (such as carousels) for selecting the image to be displayed.

The application browser receives a scroll operation and/or an operation on a GUI element, such as the selectors 74, performed by the streaming user 11 and displays a screen on the browser screen 75 in response to the operation. Displaying a website screen using the browser screen 75 allows the streaming user 11 to check the screen before sharing information with another user 10. If buttons, such as "Back", "Next", and "Top screen", linked with another URL are displayed on the browser screen 75, when one of the buttons is selected, the application browser obtains web data of the URL linked with the selected button and shifts the browser screen 75 to another screen.

The streaming user 11 can select the image that he/she wishes to share with another user 10 on the browser screen 75. The streaming user 11 can also purchase a product by selecting a purchase button on the browser screen 75.

FIG. 11 illustrates a virtual space screen 70C displayed after the second UI element 72 is operated. The third display controller 38 displays the shared information 55 based on the web data on the display object 51. Displaying the shared information 55, which is shared by the streaming user 11, in the mobile space 73 enables another streaming user 11 (streaming user 11 of the avatar object 60 in FIG. 11) sharing the same mobile space 73 and a viewing user 12 viewing the video image in the mobile space 73 to recognize the shared information 55.

Considering that the shared information 55 is displayed on the display object 51, web data indicating an image, for example, may be related to the first UI element 71. In this case, the third display controller 38 can capture the image of the browser screen 75 and display the resulting image data on the display object 51. This reduces the processing load of the streaming user device 21. Alternatively, the third display controller 38 may process the obtained web data and displays it on the display object 51. For example, the third display controller 38 may perform scraping to extract only required information, such as an image. Alternatively, the third display controller 38 may delete GUI elements, such as a search window, category tabs, and buttons, from the web data of an EC site and then display the resulting data on the display object 51. The third display controller 38 may display data without personal information of the streaming user 11 by using the application browser.

The browser screen 75 is changed in response to the operation of the streaming user 11. In contrast, the shared information 55 displayed on the display object 51 remains the same state at the time when the image based on the browser screen 75 is displayed in response to the operation on the second UI element 72. That is, a change in the browser screen 75 is not reflected in the shared information 55. In this mode, when the streaming user 11 has purchased a product on the browser screen 75, personal information of this streaming user 11 displayed by purchase processing is not displayed on the display object 51.

Alternatively, a change in the browser screen 75 may be reflected in the shared information 55 displayed on the display object 51. In other words, the shared information 55 synchronizes with the browser screen 75. In this mode, the screen recognized by the streaming user 11 can also be recognized by another user, such as a viewing user 12. This makes it easy for users 10 to communicate with each other.

As shown in FIG. 11, identification information 76 of the streaming user 11 having sent a sharing request may be displayed in relation to the display object 51. In this case, the streaming user device 21 of another streaming user 11 and the viewing user device 22 of a viewing user 12 receive sharing instruction information including the ID or the account name of the streaming user 11 having sent the sharing request.

The display object 51 can be used for various purposes, such as for information sharing between a company and a user and that between users, regardless of the relationship between an information sharing party and an information sharing subject.

In one example, an advertiser can link the URL of his/her website to the first UI element 71. For example, an advertiser who advertises products, such as clothes, as shown in FIG. 11, links the URL of the website of the products to the first UI element 71. A streaming user 11 views a product or purchases a product displayed on the browser screen 75. The streaming user 11 displays the shared information 55 on the display object 51 by operating the second UI element 72 in order to introduce a product that the streaming user 11 has purchased, ask for advice of another user 10 about a product that the streaming user 11 wishes to purchase, or simply talk about a product. The streaming user 11 may be a seller selling a product. In this case, the streaming user 11 displays the shared information 55 on the display object 51 by operating the second UI element 72 in order to give an explanation of the product.

In another example, the URL of a still image (such as a photo of the world or a commemorative photo including an avatar object 60) or a video image (such as game video) recorded by the streaming user 11 may be linked with the first UI element 71. Such a still image and a video image can be recorded in the management server 15 temporarily or continuously. In this case, the URL of an image list (such as an album) of the streaming user 11 recorded on the management server 15 is linked with the first UI element 71. When the first display controller 36 receives an operation performed on the first UI element 71, the starter 39 starts the application browser to display the image list on the browser screen 75. The image list contains thumbnail images. The starter 39 also displays a thumbnail image selected from the image list on the browser screen 75. The third display controller 38 receives an operation performed on the second UI element 72 and displays the selected image on the display object 51 as the shared information 55. In this manner, by displaying a still image or a video image taken in a past event, for example, on the display object 51, the streaming user 11 can communicate with another streaming user 11 and a viewing user 12.

Advantages of the first embodiment will be described below.

(1-1) In the first embodiment, a user 10 can display information that he/she can share on a browser screen 75 by operating the first UI element 71. The user 10 can also display, as shared information 55, information displayed on the browser screen 75 on a display object 51 within a mobile space 73 by operating the second UI element 72. Any user 10 who can view the mobile space 73 can thus recognize the shared information 55 displayed on the display object 51. Many users 10 can share the shared information 55 in this manner. Additionally, the shared information 55 is displayed in the mobile space 73 in which regular objects 50 and an avatar object 60 of another streaming user 11 are displayed. Hence, the shared information 55 can leave an impression on users 10.

(1-2) In the first embodiment, if multiple streaming users 11 share the same mobile space 73, each streaming user 11 can recognize shared information 55 displayed based on a sharing request sent from the streaming user device 21 of another streaming user 11. It is thus possible to share plural items of shared information 55 among multiple users.

(1-3) In the first embodiment, shared information 55 is displayed on all the display objects 51 displayed in a mobile space 73. In this mode, the shared information 55 can be displayed on multiple display objects 51. The shared information 55 is thus likely to enter the viewing range of a streaming user 11, thereby enhancing the appeal effect on a user 10.

(1-4) In the first embodiment, the first UI element 71 and the second UI element 72 are displayed only by the streaming user device 21. That is, only a streaming user 11 can make a sharing request for shared information 55. A sharing request is thus less frequently sent than when all the users 10 viewing the screen of a mobile space 73 are allowed to send a sharing request. Accordingly, the same shared information 55 can be displayed on a display object 51 for a longer time. Additionally, shared information 55 displayed on a display object 51 is less frequently changed.

Second Embodiment

Figure 12:
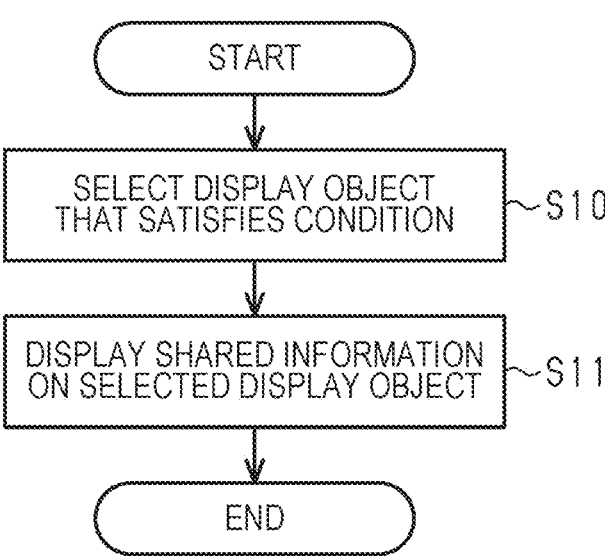
FIG. 12 is a flowchart illustrating a processing procedure executed by a user device according to a second embodiment.

A second embodiment of a program, an information processing method, and an information processing system will be described below with reference to FIGS. 12 through 14. In the second embodiment, the streaming user device 21 of a streaming user 11 displays shared information 55 on a display object 51 which has a predetermined relationship with the avatar object 60 of the streaming user 11. Elements similar to those of the first embodiment are designated by like reference numerals and a detailed explanation thereof will be omitted.

Figure 7:
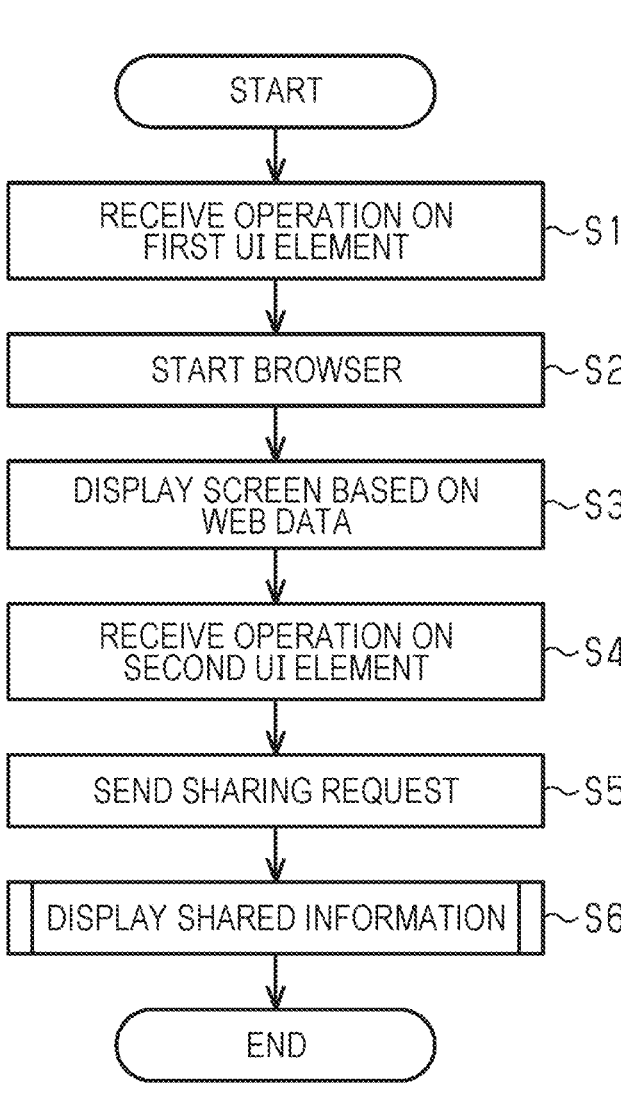
FIG. 7 is a flowchart illustrating a processing procedure executed by a user device according to the first embodiment.

The second embodiment is different from the first embodiment in display processing for shared information 55 (step S6 of FIG. 7).

Display processing for shared information 55 will be discussed below with reference to FIG. 12. Upon receiving an operation performed on the second UI element 72, the streaming user device 21 executes display processing by using web data displayed by the application browser. Another streaming user device 21 or a viewing user device 22 which receives sharing instruction information obtains web data linked with the URL included in the sharing instruction information.

In step S10, the third display controller 38 selects an object that satisfies a display condition from among objects disposed in a mobile space 73. The third display controller 38 selects a display object 51 that satisfies at least one of the following two conditions.

(Condition 1) The relative distance of a display object 51 to an avatar object 60 is smaller than or equal to a predetermined distance.

(Condition 2) The parameter concerning the priority of a display object 51 is higher than or equal to the priority set for shared information 55.

In step S11, the third display controller 38 displays the shared information 55 on the display object 51 that satisfies the display condition.

Condition 1 will be explained below with reference to FIG. 13. FIGS. 13 and 14 show examples in which display objects 51 are displayed in relation to objects drawn based on three-dimensional model data.

Figure 13:
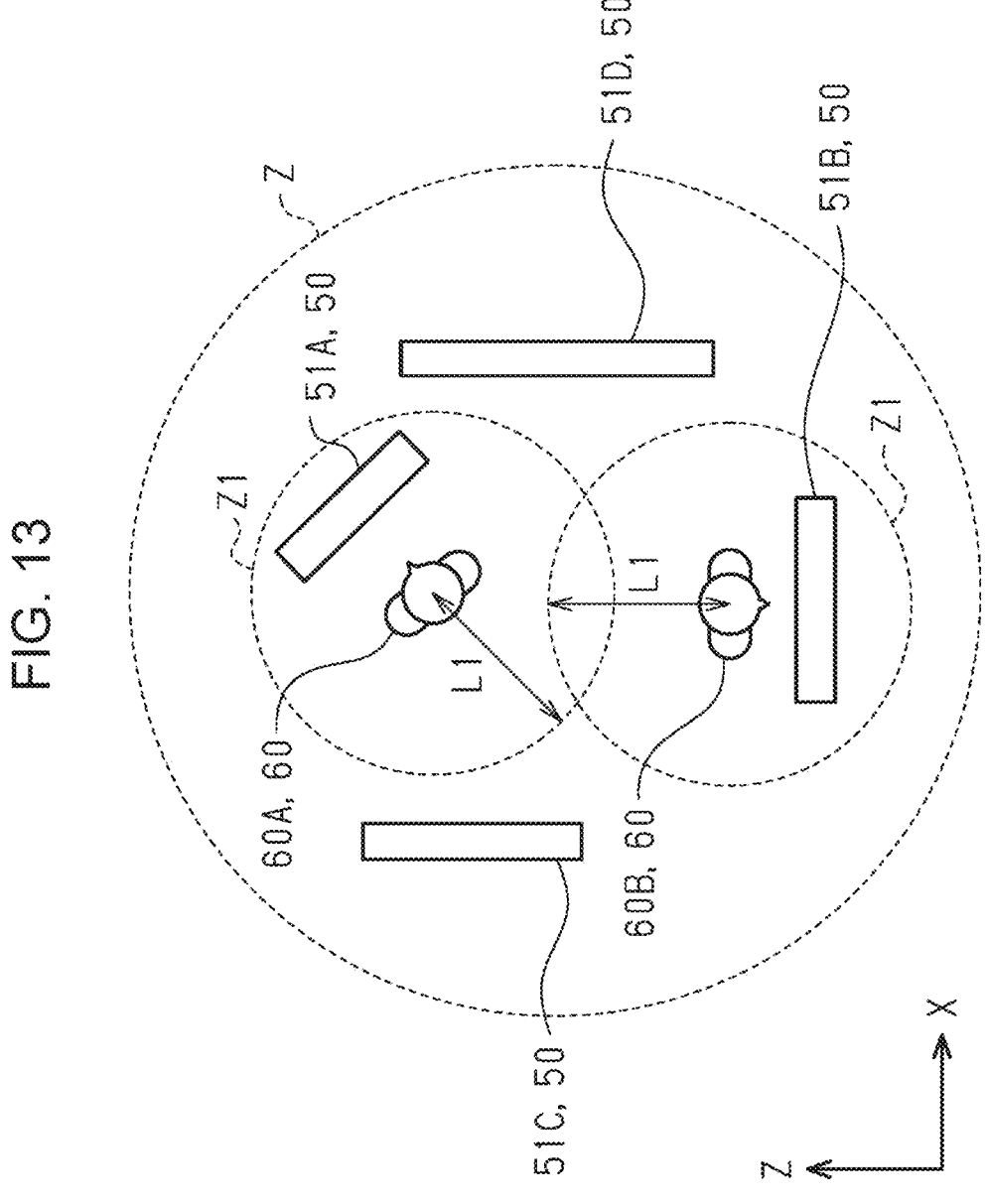
FIG. 13 illustrates a screen displayed on a user device according to the second embodiment.
Figure 14:
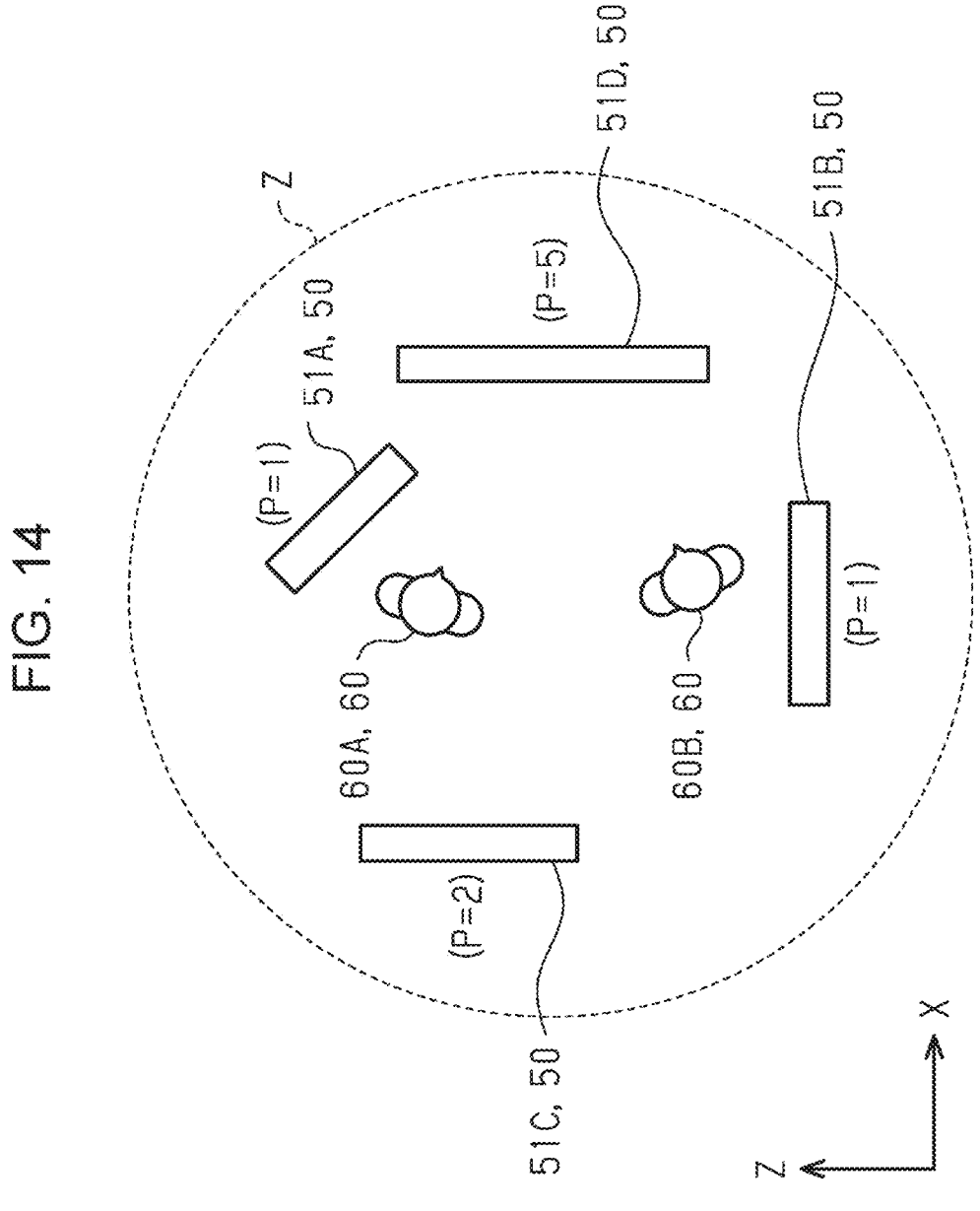
FIG. 14 illustrates a screen displayed on a user device according to the second embodiment.

In the example in FIG. 13, display objects 51A through 51D are disposed in a mobile space 73. The third display controller 38 of the streaming user device 21 used by a streaming user 11A calculates a relative distance L1 between the position of an avatar object 60A of the streaming user 11A and each of the display objects 51A through 51D. Then, the third display controller 38 determines a zone Z1 separated from the avatar object 60A by the relative distance L1 which is smaller than or equal to a predetermined distance and selects the display object 51A included within the zone Z1 as the display object 51 used for displaying shared information 55. When calculating the relative distance L1, the third display controller 38 may calculate the relative distance L1 only for the display objects 51 located within a predetermined distance zone Z of the mobile space 73. Instead of using the avatar object 60A, the third display controller 38 may calculate the relative distance L1 between the virtual camera 65 corresponding to the streaming user 11A and each of the display objects 51A through 51D.

The third display controller 38 of the streaming user device 21 used by a streaming user 11B calculates a relative distance L1 between the position of an avatar object 60B of the streaming user 11B and each of the display objects 51A through 51D. Then, the third display controller 38 determines a zone Z1 separated from the avatar object 60B by the relative distance L1 which is smaller than or equal to the predetermined distance and selects the display object 51B included within the zone Z1 as the display object 51 used for displaying shared information 55. Instead of using the avatar object 60B, the third display controller 38 may calculate the relative distance L1 between the virtual camera 65 corresponding to the streaming user 11B and each of the display objects 51A through 51D.

A viewing user device 22 draws an image viewed from the virtual camera 65 of a host user 11H. If the streaming user 11A is the host user 11H, the viewing user device 22 displays the shared information 55 on the display object 51A, which is located close to the avatar object 60A.

That is, even when the image of the same mobile space 73 is displayed on multiple user devices 20, the display object

51 used for displaying the shared information 55 in one user device 20 may be different from that in another user device 20. A display object 51 may be related to a regular object 50, which is a mobile body, such as an airship or a mobile billboard. In this case, when the mobile body moves, the distance between the avatar object 60 and the mobile body may exceed the relative distance L1. In this case, the user device 20 used by the user 10 corresponding to the avatar object 60 stops displaying the shared information 55 on the mobile body.

Condition 2 will be explained below with reference to FIG. 14. The third display controller 38 obtains the parameter related to each of the display objects 51A through 51D located within the predetermined distance zone Z. The parameter becomes larger as the priority is higher. The parameter of the display object 51A and that of the display object 51B are "1"; the parameter of the display object 51C is "2"; and the parameter of the display object 51D is "5". Not only for the display objects 51A through 51D within the predetermined distance zone Z, the third display controller 38 may obtain the parameters of all the objects 51 in the mobile space 73.

The third display controller 38 displays the shared information 55 on a display object 55 having a parameter value "3" or greater, for example. In the above-described example, the third display controller 38 displays the shared information 55 on the display object 51D. The threshold for determining a display object 51 to be used for displaying the shared information 55 is changed in accordance with how the shared information 55 is used. For instance, if it is desirable that the shared information 55 be recognized by users 10 highly frequently, the threshold for the shared information 55 is set to "1". Then, the shared information 55 is displayed on the display objects 51 having a parameter value "1" or greater, so that as many users 10 as possible view the shared information 55, which may be about a product on sale. If it is desirable to enhance the appeal effect of the shared information 55, the threshold for the shared information 55 is set to "3". A display object 51 having a parameter value "3" or greater is a display object 51 located at a noticeable position in the mobile space 73 or a display object 51 having a large display area. The shared information 55 is displayed on the display objects 51 having a parameter value "3" or greater, thereby enhancing the appeal effect of the shared information 55.

The user device 20 or the management server 15 may dynamically determine the parameter value concerning the priority based on the behavior (operation) of a user 10. For example, the user device 20 or the management server 15 may dynamically determine the parameter value concerning the priority, based on the virtual optical axis of the virtual camera 65. The virtual optical axis can also be regarded as the line-of-sight direction of the avatar object 60 or the line-of-sight direction of the user 10 within the mobile space 73. The user device 20 or the management server 15 may set a greater parameter value for a display object 51 having a small relative distance to the optical axis so as to set a higher priority for this display object 51. Conversely, the user device 20 or the management server 15 may set a smaller parameter value for a display object 51 having a long relative distance to the optical axis so as to set a lower priority for the display object 51. The relative distance of a display object 51 to the optical axis can be represented by the length of a normal line extending from the display object 51 toward the optical axis. Alternatively, the user device 20 or the management server 15 dynamically determines the parameter value concerning the priority based on the action range of the avatar object 60 in the mobile space 73. The action range can be specified based on the movement path made by the avatar object 60. For example, the action range is a range including the movement path of the avatar object 60. The user device 20 or the management server 15 sets a greater parameter value for a display object 51 included in the action range so as to set a higher priority for the display object 51. The user device 20 or the management server 15 sets a greater parameter value for a display object 51 located relatively close to the action range so as to set a higher priority for the display object 51, and also sets a smaller parameter value for a display object 51 located relatively far away from the action range so as to set a lower priority for the display object 51. Dynamically determining the parameter value in this manner can display shared information 55 on a display object 51 that can be easily recognized by a user 10 in accordance with the tendency of the behavior/action of the user 10. Even when the tendency of the behavior/action differs depending on the user 10, the shared information 55 can be displayed on a display object 51 that can be easily recognized by each user 10.

When a new display object 51 is added to the mobile space 73, the user device 20 or the management server 15 may dynamically determine the parameter value concerning the priority based on the attribute of the new display object 51. For example, as the display object 51 is higher or larger, more users are likely to recognize the display object 51. The user device 20 or the management server 15 may dynamically determine the parameter value concerning the priority, based on the height or the size of the display object 51. As the display object 51 is higher, a greater parameter value may be set. As the display object 51 is larger, a greater parameter value may be set. The attribute of the display object 51 may be other than the height or the size. For example, the attribute of the display object 51 may be the color or the effect (expression in a video image) related to the display object 51.

If the shared information 55 is an advertisement, the cost to be paid by an advertiser for the shared information 55 may be determined depending on the parameter value of a display object 51 or the number of display objects 51. If the shared information 55 is an advertisement, the user device 20 may count the number of times the shared information 55 is included in the viewing range of the virtual camera 65. Including the shared information 55 in the viewing range of the virtual camera 65 means displaying the shared information 55 on the display 109 of the user device 20. The user device 20 sends the counted number of times to the management server 15. Then, the management server 15 adds the number of times received from each user device 20 and determines the cost to be paid by the advertiser based on the total number of times. As the number of times is greater, the cost becomes higher.

According to the second embodiment, the following advantage can be obtained in addition to the advantages (1-1) through (1-3) of the first embodiment.

(2-1) In the second embodiment, shared information 55 is displayed on a display object 51 that satisfies a display condition regarding the positional relationship with an avatar object 60. If a display object 51 positioned close to the avatar object 60 is selected, it means that the shared information 55 is displayed on a display object 51 which is likely to be displayed in the virtual space screen 70. This saves the user device 20 displaying the shared information 55 on all the display objects 51, thereby reducing the processing load for rendering.

Third Embodiment

A third embodiment of a program, an information processing method, and an information processing system will be described below with reference to FIGS. 15 through 17. In the third embodiment, a viewing user device 22, as well as a streaming user device 21, can start the application browser. Elements similar to those of the first embodiment are designated by like reference numerals and a detailed explanation thereof will be omitted.

Figure 15:
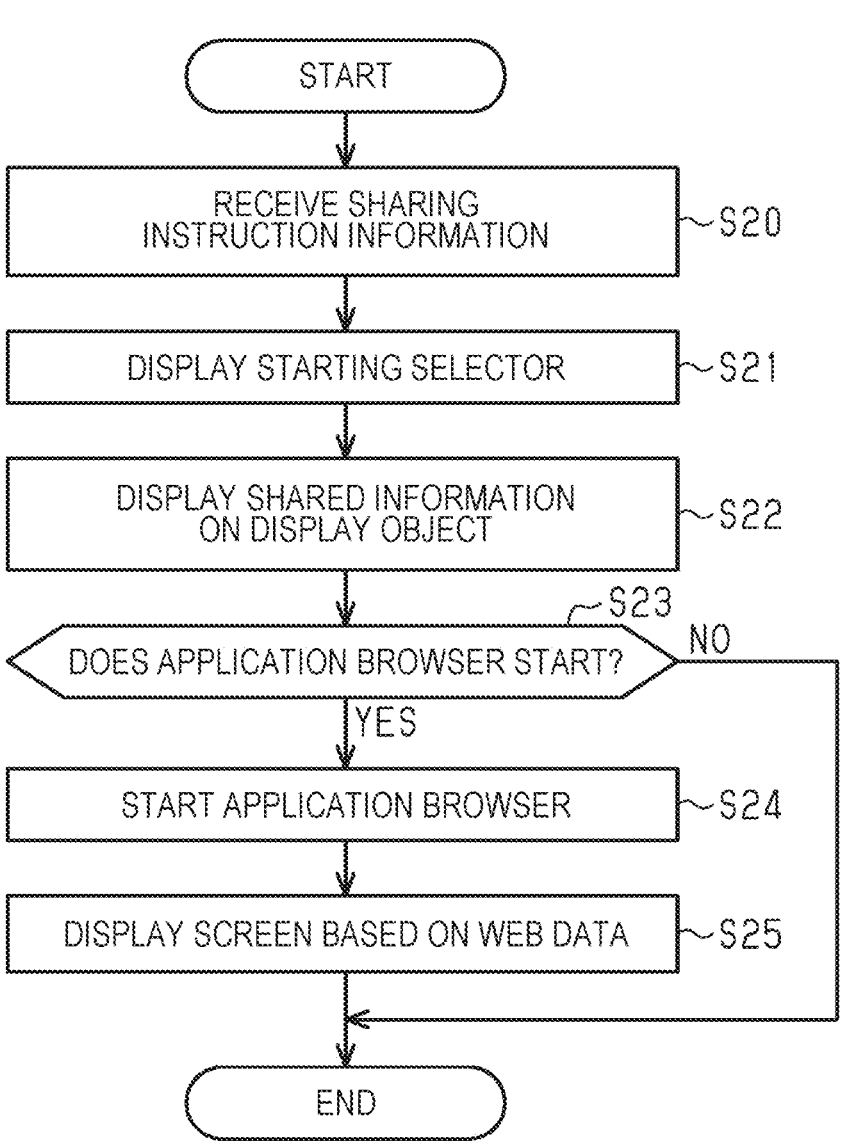
FIG. 15 is a flowchart illustrating a processing procedure executed by a user device according to a third embodiment.

FIG. 15 illustrates a processing procedure executed by a streaming user device 21 or a viewing user device 22 having received sharing instruction information to display shared information 55.

In step S20, the sharing module 40 receives sharing instruction information from the management server 15. In step S21, the starter 39 displays a starting selector on the screen. The starting selector is a UI for selecting whether to display shared information 55 by using the application browser installed in the user device 20.

In step S22, the third display controller 38 displays the shared information 55 on a display object 51 by using the URL included in the sharing instruction information. Step S22 may be executed before step S21 or simultaneously with step S21.

In step S23, the starter 39 determines whether to start the application browser, based on the operation performed on the starting selector by the user. If the starter 39 determines based on the operation performed by a viewing user 12 that the application browser is not started (NO in step S23), it terminates display processing.

If the starter 39 determines that the user has performed an operation for starting the application browser (YES in step S23), it starts the application browser in step S24. In step S25, the application browser displays the screen based on web data of the URL included in the sharing instruction information.

Figure 16:
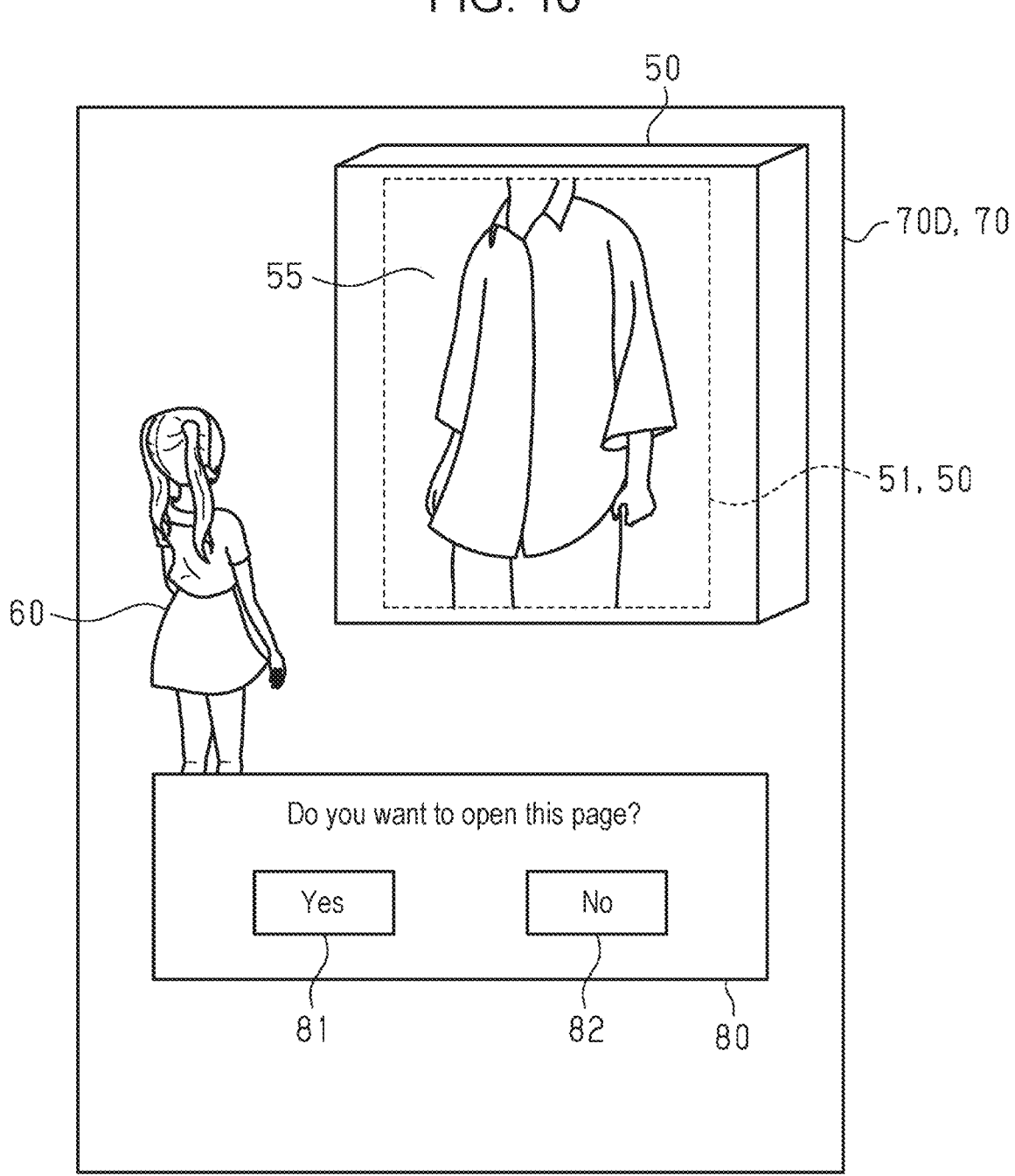
FIG. 16 illustrates a screen displayed on a user device according to the third embodiment.

FIG. 16 illustrates an example of a viewing screen 70D displayed by a viewing user device 22. The third display controller 38 of the viewing user device 22 displays a virtual space image viewed from the virtual camera 65 of the host user 11H. The viewing screen 70D shown in FIG. 16 is a viewing screen generated when rendering is performed from the third person viewpoint. The viewing screen 70D of the third person viewpoint includes the image of the avatar object 60 of the host user 11H.

The shared information 55 is displayed on the display object 51. The viewing screen 70D includes a starting selector 80. The starting selector 80 includes a button 81 for opening the browser screen 75 and a button 82 for choosing not to open the browser screen 75.

Figure 17:
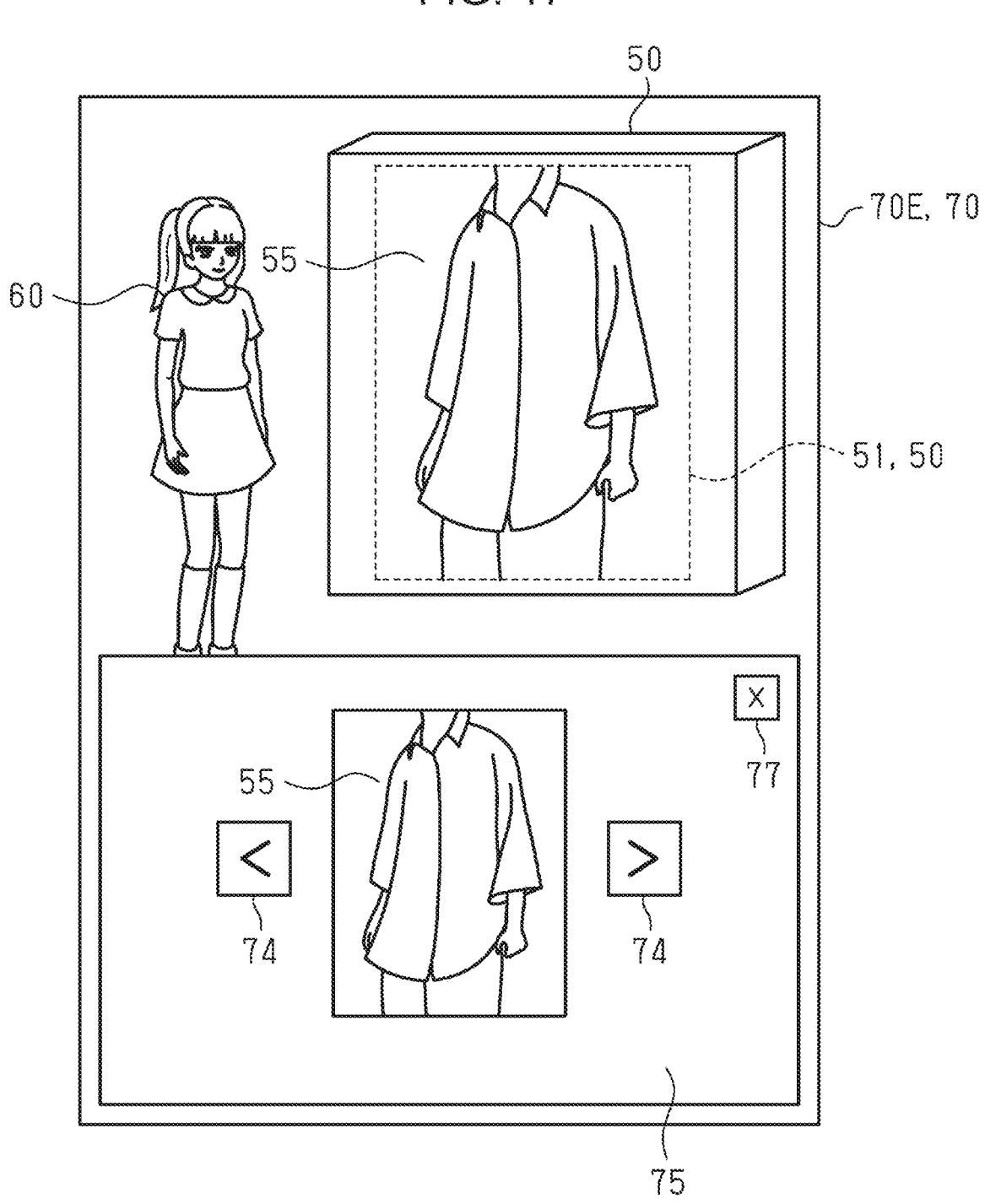
FIG. 17 illustrates a screen displayed on a user device according to the third embodiment.

FIG. 17 illustrates a viewing screen 70E to be displayed when a user operation on the button 81 for opening the browser screen 75 is received. The viewing screen 70E includes the browser screen 75. The viewing user 12 can view the website corresponding to the shared information 55 displayed on the browser screen 75. For example, the viewing user 12 can purchase a product posted on the website by operating a UI element displayed on the browser screen 75.

According to the third embodiment, the following advantage can be obtained in addition to the advantages (1-1) through (1-4) of the first embodiment.

(3-1) In the third embodiment, a user 10 can select whether to display the browser screen 75 corresponding to shared information 55 shared by another user 10. If the user 10 becomes interested in the shared information 55, he/she can collect detailed information about the shared information 55 by starting the application browser without conducting a search by starting an independent web browser. The user device 20 does not automatically start the application browser when receiving sharing instruction information, which makes the viewing user 12 less uncomfortable.

Fourth Embodiment

A fourth embodiment of a program, an information processing method, and an information processing system will be described below with reference to FIG. 18. In the fourth embodiment, the streaming user device 21 of a streaming user 11 can share a certain item of information selected by the streaming user 11. Elements similar to those of the first embodiment are designated by like reference numerals and a detailed explanation thereof will be omitted.

Figure 18:
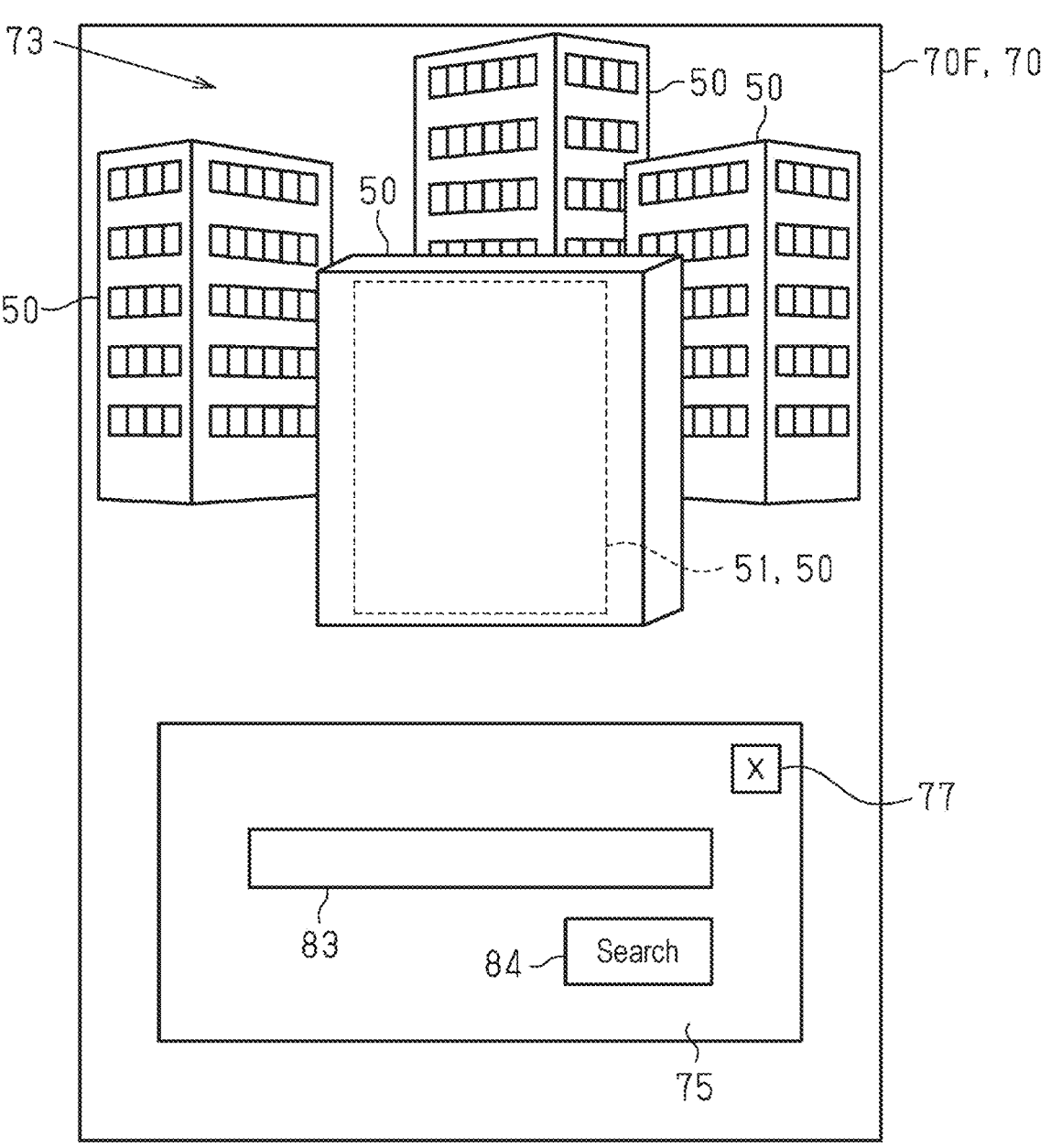
FIG. 18 illustrates a screen displayed on a user device according to a fourth embodiment.

FIG. 18 illustrates a virtual space screen 70F to be displayed after a streaming user 11 starts the application browser. The URL of a website that can conduct a search is linked with the first UI element 71. When the first display controller 36 has received an operation performed on the first UI element 71, the starter 39 starts the application browser. Then, the application browser displays a screen including a search window 83 and a search execution button 84. The streaming user 11 inputs a search word into the search window 83 and operates the search execution button 84.

The streaming user device 21 sends the search word to the web server 120 having a search engine. The streaming user device 21 receives search results from the web server 120 and displays the search results on the browser screen 75. Upon receiving an operation for selecting one of the search results, the application browser requests the web server 120 to send web data of the URL corresponding to the selected search result. Upon receiving the web data from the web server 120, the application browser displays the image based on the web data on the browser screen 75. As in FIG. 10, the second UI element 72 is displayed within or near the browser screen 75. The second display controller 37 receives an operation performed on the second UI element 72 and sends a sharing request including the URL of information to be shared to the management server 15.

According to the fourth embodiment, the following advantage can be obtained in addition to the advantages (1-1) through (1-4) of the first embodiment.

(4-1) In the fourth embodiment, a streaming user 11 can search for a certain item of information and allow another user 10 to share this item of information, thereby expanding the range of information to be shared.

Fifth Embodiment

A fifth embodiment of a program, an information processing method, and an information processing system will be described below with reference to FIG. 19. In the fifth embodiment, regardless of a streaming user 11 or a viewing user 12, any user 10 can move in a mobile space 73. That is, in the fifth embodiment, as in the streaming user device 21 in the first through fourth embodiments, a user device 20 sends drawing data to the management server 15. The drawing data indicates at least the position of the avatar object 60 of each user 10. The user device 20 also draws the avatar object 60 of another user by using drawing data received from the user device 20 of this user via the management server 15. Elements similar to those of the first embodiment are designated by like reference numerals and a detailed explanation thereof will be omitted.

In the fifth embodiment, all users 10 can share information by sending a sharing request. If each user 10 sends a sharing request at a desired timing, shared information 55 displayed on the same display object 51 may be changed frequently. In this case, before a user 10 checks a certain piece of shared information 55 properly, this piece of shared information 55 may be switched to another piece of shared information 55.

To address this issue, in the fifth embodiment, when receiving a sharing request from a user 10, the management server 15 does not display shared information 55 on all the display objects 51, but displays it on a display object 51 in a certain order.

Figure 19:
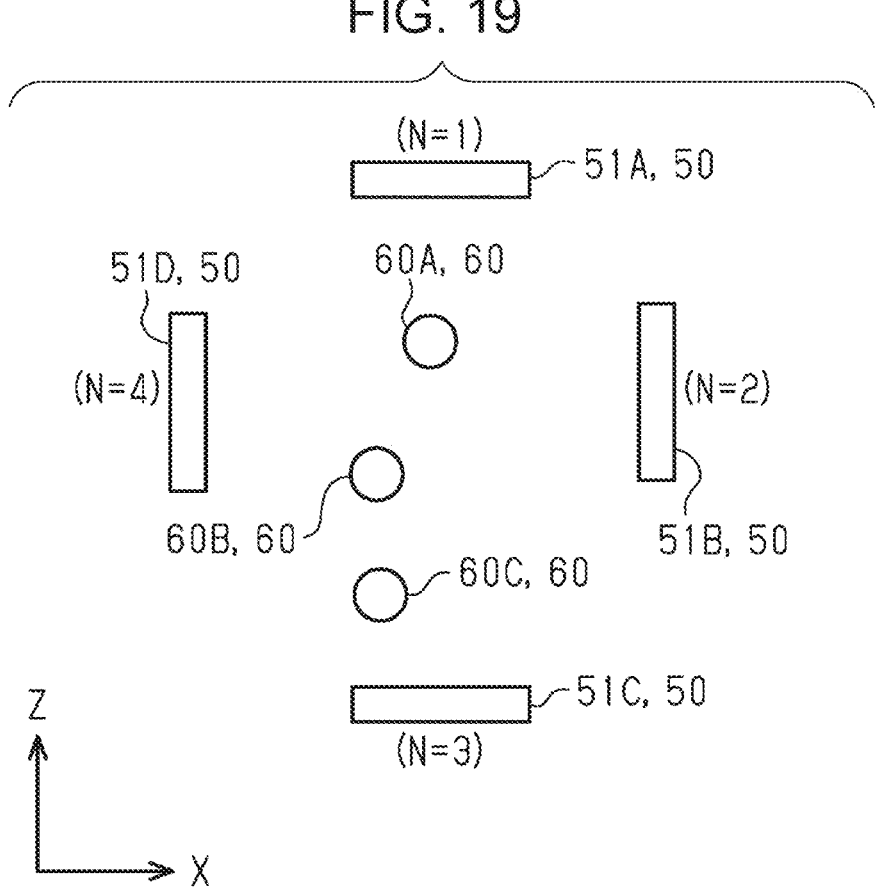
FIG. 19 illustrates a screen displayed on a user device according to a fifth embodiment.

As illustrated in FIG. 19, numbers N (1 through 4) are appended to the display objects 51A through 51D in the mobile space 73. When receiving a sharing request, the management server 15 allocates corresponding shared information 55 to a display object 51 in accordance with the numbers N.

Upon receiving a sharing request from the user device 20 of a first user 10 having the avatar object 60A, the management server 15 sends sharing instruction information to individual user devices 20 to instruct them to display the shared information 55 of the sharing request sent from the first user 10 on the display object 51A having the number N=1. The sharing instruction information includes the URL of the shared information 55 and identification information of the display object 51A.

Then, upon receiving a sharing request from the user device 20 of a second user 10 having the avatar object 60B, the management server 15 sends sharing instruction information to individual user devices 20 to instruct them to display the shared information 55 of the sharing request sent from the second user 10 on the display object 51B having the number N=2. The sharing instruction information includes the URL of the shared information 55 and identification information of the display object 51B.

Likewise, upon receiving a sharing request from the user device 20 of a third user 10 having the avatar object 60C, the management server 15 sends sharing instruction information to individual user devices 20 to instruct them to display the shared information 55 of the sharing request sent from the third user 10 on the display object 51C having the number N=3. The sharing instruction information includes the URL of the shared information 55 and identification information of the display object 51C.

When receiving another sharing request in a state in which shared information 55 is displayed on all the display objects 51A through 51D, the management server 15 instructs each user device 20 to cancel the shared information 55 displayed on the display object 51 having the number N=1. Then, the management server 15 sends new sharing instruction information to each user device 20. The third display controller 38 of each user device 20 then displays new shared information 55 on the display object 51A.

According to the fifth embodiment, the following advantage can be obtained in addition to the advantages (1-1) through (1-4) of the first embodiment.

(5-1) In the fifth embodiment, all users 10 can share information by sending a sharing request. Shared information 55 shared by each user 10 is displayed on a display object 51 in a certain order. For example, one piece of shared information 55 shared by each user 10 is displayed on a display object 51, and then, another piece of shared information 55 shared by each user 10 is displayed on another display object 51. With this configuration, even if sharing requests are sent frequently, the same shared information 55 can be displayed long enough for each user 10 to check it properly.

The above-described embodiments can be modified and carried out in the following manner. The above-described embodiments and the following modifications may be combined and carried out as long as the resulting configurations do not become technically inconsistent.

(User)

In the above-described embodiments, a streaming user 11 means a user sending at least one of information on images (video images) and information on sound. For example, the streaming user 11 is a user executing solo video streaming or collaboration streaming in which multiple users can participate. Alternatively, the streaming user 11 may be a user organizing or hosting a video chat or a voice chat where multiple users can participate in and/or view or organizing or hosting an event (such as a party) in a virtual space where multiple users can participate in and/or view. That is, the streaming user 11 can also be regarded as a host user or an organizing user.

In contrast, a viewing user 12 means a user receiving at least one of information on images (video images) and information on sound. Yet, the viewing user 12 not only receives such information, but also can react to received information. The viewing user 12 is a user viewing video streaming or collaboration streaming, for example. Alternatively, the viewing user 12 may be a user participating in and/or viewing a video chat, a voice chat, or an event. That is, the viewing user 12 can also be regarded as a guest user, a participant user, a listener, a spectator user, or a supporter user.

The first through fourth embodiments have been discussed on the precondition that the streaming user 11 shares (provides) information. Instead of this configuration, not only the streaming user 11, but also the viewing user 12 may also be able to share (provide) information in the first through fourth embodiments. In this case, the first display controller 36 of the viewing user device 22 of the viewing user 12 displays the first UI element 71 on the virtual space screen 70. The second display controller 37 of the viewing user device 22 displays the second UI element 72 on the virtual space screen 70. The starter 39 of the viewing user device 22 starts the application browser. The application browser displays web data.

(Avatar Object)

In the above-described embodiments, the user device 20 of a streaming user 11 draws the avatar object 60 of the streaming user 11 by using tracking data or emote data generated by detecting the action of the streaming user 11. This can reflect the action of the streaming user 11 or the action selected by the streaming user 11 in the avatar object 60. In addition to or instead of this configuration, the user device 20 may draw the avatar object 60 without using tracking data or emote data temporarily or continuously. In this mode, when drawing many avatar objects 60 in the mobile space 73, the user device 20 can reduce the load of drawing processing.

In the above-described embodiments, the user device 20 draws the avatar object 60 of each streaming user 11. Alternatively, the user device 20 may draw the mobile space 73 from the first person viewpoint and may not necessarily draw the avatar objects 60 of all the users 10.

In the above-described embodiments, the user device 20 draws the avatar object 60 of each streaming user 11. In addition to or instead of this configuration, the user device

20 may draw the avatar object 60 of a viewing user 12. In this case, the user device 20 may draw the avatar object 60 of a viewing user 12 with a lower processing load than that when the user device 20 draws the avatar object 60 of a streaming user 11. For example, the avatar object 60 of a viewing user 12 is displayed in a two-dimensional image; motion data is not reflected in the avatar object 60 of a viewing user 12; or sound of a viewing user 12 is not output.

(Video Image)

The first through fourth embodiments have been discussed on the precondition that the streaming user device 21 performs video streaming. In addition to or instead of this configuration, the user device 20 may display a virtual space image without performing video streaming. The user 10 starts the application to select a desired mobile space 73. The user device 20 then displays a virtual space screen of the mobile space 73 as viewed from each virtual camera 65. The user device 20 changes the position of the virtual camera 65 in response to a user operation. In this mode, the user 10 can freely explore the mobile space 73. The user 10 can also recognize shared information 55 displayed on a display object 51 or display shared information 55 on a display object 51 while exploring the mobile space 73.

In the first through fourth embodiments, a viewing user 12 can view a virtual space screen by selecting a room. Alternatively, a user 10 may be able to view a virtual space screen as a viewing user 12 only when the user 10 receives permission from a host user 11H. For example, the user device 20 may send a viewing request to the streaming user device 21 of the host user 11H via the management server 15. Then, when receiving permission information from the streaming user device 21 in response to the viewing request, the user device 20 may display a virtual space screen by using the URL or another information included in the permission information.

(Parameter)

The user device 20 of a user 10 may be able to send a sharing request when a parameter related to the user 10 has a predetermined value or greater. Alternatively, when receiving a sharing request from the user device 20 of a user 10 having a parameter of a predetermined value or greater, the management server 15 may send sharing instruction information to another user device 20. The parameter may be accumulated points, coins, or the number of friends on the application. The definition of a friend is as follows. For a first user, a second user becomes a friend of the first user when the first user accepts the second user as a friend and when the second user also accepts the first user as a friend. The parameter may be a parameter concerning an avatar object 60, such as about attack power, defense power, combat power, or physical strength (hit points) of the avatar object 60.

(Starter)

In the above-described embodiments, the starter 39 of a user device 20 starts the application browser to obtain web data of a URL from an external server, such as the web server 120. In addition to or instead of this configuration, the starter 39 may request the management server 15 to send a URL when the user 10 operates the first UI element 71. In response to a request for web data, the management server 15 reads the URL recorded on the management server 15. The web data of the URL is data which is processed to adjust to the layout suitable for the browser screen 75. The management server 15 sends the read URL to the user device 20. Upon receiving the URL from the management server 15, the user device 20 requests the web server 120 to send the webpage of the URL. In this mode, the management server

15 may be able to change the URL to be sent to the user device 20 during the streaming period of the same video. For example, every time the management server 15 receives a request for the URL from the user device 20, it may send a different URL to the user device 20. Then, the user device 20 can display a different image on the browser screen 75 every time the user 10 operates the first UI element 71.

As stated above, the starter 39 may start a web browser separately provided from the application, instead of the application browser. The web browser separately provided from the application will simply be called a web browser. The functions of the application browser are similar to those of a web browser. In this mode, when receiving an operation performed on the first UI element 71 by the user 10, the starter 39 starts the web browser. At this time, the starter 39 specifies the URL of web data for the web browser. The web browser obtains the web data linked with the first UI element 71 and displays the obtained web data.

When receiving an operation performed on the second UI element 72 by the user 10, the sharing module 40 sends a sharing request to share information displayed by the web browser with another user device 20 (device used by a different user) to the management server 15.

By using a technique such as texture mapping, the third display controller 38 projects, as shared information 55, the image based on the web data displayed by the second display controller 37 using the web browser onto a display object 51. The third display controller 38 may obtain the web data from the web browser or capture a screen displayed by the web browser.

(Display Condition)

In the second embodiment, shared information 55 is displayed on a display object 51 that satisfies at least one of condition 1 and condition 2. Alternatively, only condition 1 may be used as the display condition, or only condition 2 may be used as the display condition.

(Priority)

Plural types of shared information 55 may be displayed in the mobile space 73. In this case, the URL to be linked with the first UI element 71 may be changed in accordance with the position of the shared information 55 to be displayed in the mobile space 73, as described in the first embodiment. Alternatively, the URL to be linked with the first UI element 71 may be changed depending on the time slot in the streaming period. For example, in a first time slot for ten minutes after starting streaming, the first UI element 71 linked with a first URL may be displayed on the virtual space screen 70. In a second time slot following the first time slot, the first UI element 71 linked with a second URL may be displayed on the virtual space screen 70.

If it is possible to display plural types of shared information 55 and if these types of shared information 55 are displayed on all the display objects 51, the priority may be set for the URLs. When the third display controller 38 receives multiple items of sharing instruction information, if plural types of shared information 55 corresponding to these items of sharing instruction information are waiting to be displayed, the third display controller 38 may sequentially display the plural types of shared information 55 in order of priority. The priority set for shared information 55 is indicated by the sharing instruction information. Alternatively, when the management server 15 has received multiple sharing requests during a certain period, it may send sharing instruction information to user devices 20 in order of priority set for the sharing requests.

(Profit)

When the first UI element 71 is operated in a user device 20, the management server 15 may receive operation detection information from the user device 20. By using the operation detection information, the management server 15 may add the number of times the first UI element 71 is operated in each user device 20 and calculate the advertising cost in accordance with the added number of times. Alternatively, when the second UI element 72 is operated in a user device 20, the management server 15 may receive operation detection information from the user device 20. By using the operation detection information, the management server 15 may add the number of times the second UI element 72 is operated in each user device 20 and calculate the advertising cost in accordance with the added number of times. This can vary the advertising cost in accordance with the effect assessed based on the number of times the user 10 views or shares the browser screen 75 based on the web data.

(Streaming and Viewing Method)

In the above-described embodiments, the user device 20 performs video streaming and viewing by using client rendering. However, the user device 20 may employ the above-described other methods. For example, if the user device 20 draws data by browser rendering, it displays the virtual space screen 70 by using the application browser or an independent web browser. When the first UI element 71 is operated, the user device 20 opens the browser screen 75 with the application browser or the web browser to display the web data linked with the first UI element 71.

In browser rendering, as a technique for generating a file for displaying the virtual space screen 70 and the browser screen 75 by performing rendering, at least one of known techniques, such as static rendering (static server-side rendering), server-side rendering (SSR), client-side rendering (CSR), prerendering (CSR with prerendering), and hydration rendering (SSR with hydration (or rehydration)), can be used. "Rendering" in this example is to analyze data described in a markup language or another file and to calculate the positions of image elements and text to be displayed on the virtual space screen 70 and the browser screen 75.

In static server-side rendering, the web server 120 records a static HTML file in advance and the user device 20 downloads the static HTML file from the web server 120. The user device 20 then outputs the HTML file subjected to rendering to the display 109 and displays the virtual space screen 70 and the browser screen 75 on the display 109. In server-side rendering (SSR), the web server 120 performs rendering in response to a request from the user device 20 and sends an HTML file subjected to rendering to the user device 20. The user device 20 then outputs the downloaded HTML file to the display 109 and displays the virtual space screen 70 and the browser screen 75 on the display 109. The web server 120 includes an application server. In client-side rendering (CSR), the user device 20 performs rendering by executing JavaScript (registered trademark). The user device 20 downloads a simplified HTML file from the web server 120 and also downloads required programming languages and files, such as JavaScript (registered trademark) and a CSS file. In prerendering, which is one type of CSR, the user device 20 generates and records part of an HTML file in advance. The user device 20 then downloads required items of content from the web server 120 in response to a request and performs rendering. In hydration rendering, the web server 120 generates and records an HTML file which is not subjected to rendering. The user device 20 then downloads the HTML file from the web server 120 and also downloads required data based on the HTML file and performs rendering. In the above-described techniques, the user device 20 may obtain data from the management server 15 instead of from the web server 120.

(Information Processing System)

In the above-described embodiments, the user device 20 is an information processing device, such as a smartphone, a mobile phone, a tablet terminal, a personal computer, a console game machine, a wearable computer such as a head-mounted display. Alternatively, the information processing system may be a system installed in a video streaming studio. The information processing system includes devices, such as an information processing device, a server, a sensor unit worn on the body of a streaming user 11, a tracking system for detecting the position of the sensor unit, an operation unit, a speaker, and a display. The tracking system may include a multi-axis laser emitter that emits pulse laser light for providing synchronization. The sensor unit includes a sensor for detecting laser light emitted from the multi-axis laser emitter and detects the position and the orientation of the sensor unit while synchronizing using a synchronizing pulse.

The user device 20 functions as the first display controller 36, second display controller 37, third display controller 38, starter 39, and sharing module 40 as a result of executing the application. At least one of these elements may be executed by another device forming the management server 15 or the information processing system 1. For example, the management server 15 may send at least one of a request to display the first UI element 71, a request to start the application browser, and a request to display the second UI element 72 to the user device 20. The management server 15 may send image data for displaying shared information on a display object 51 located in a virtual space to the user device 20.

The technical concept that can be conceived from the above-described embodiments and other examples will be described below.

[A] A program causing one or more computers to function as:

a first display controller that displays a first user interface element on a screen of a virtual space, the first user interface element being used for starting an application browser;

a starter that starts the application browser when an operation performed on the first user interface element by a user is received;

a second display controller that displays a second user interface element used for sharing information displayed by the application browser;

a sharing module that sends a sharing request to a server when an operation performed on the second user interface element by the user is received, the sharing request being a request to share information displayed by the application browser with a device used by a different user who is viewing the screen of the virtual space; and a third display controller that displays, as shared information, information displayed by the application browser on a display object disposed in the virtual space.

[B] The program according to [A], wherein, when an instruction based on a sharing request sent from the device of the different user is received from the server, the third display controller displays information that the different user is sharing on the display object.

[C] The program according to [A] or [B], wherein the third display controller displays the shared information on all display objects disposed in the virtual space.

[D] The program according to [A] or [B], wherein the third display controller selects, among plural display objects disposed in the virtual space, a display object that satisfies a display condition regarding a positional relationship with a position of the user in the virtual space and displays the shared information on the selected display object.

[E] The program according to one of [A] to [D], wherein:

when an instruction based on a sharing request sent from the device of the different user is received from the server, the third display controller displays a third user interface element used for selecting whether to start the application browser; and when an operation performed on the third user interface element to start the application browser is received, the starter displays information that the different user is sharing by using the application browser.

[F] The program according to one of [A] to [E], wherein the starter obtains web data linked with the first user interface element from a web server and displays the obtained web data by using the application browser.

[G] The program according to one of [A] to [F], wherein information obtained as a result of inputting a search word into a search screen displayed by the application browser is displayed on the display object as the shared information.

[H] The program according to one of [A] to [G], wherein the first display controller displays the first user interface element and the second user interface element only when the user is a streaming user to stream a video image of the virtual space.

[I] An information processing method to be executed by one or more computers, comprising:

first display control processing for displaying a first user interface element on a screen of a virtual space, the first user interface element being used for starting an application browser;

starting processing for starting the application browser when an operation performed on the first user interface element by a user is received;

second display control processing for displaying a second user interface element used for sharing information displayed by the application browser;

sharing processing for sending a sharing request to a server when an operation performed on the second user interface element by the user is received, the sharing request being a request to share information displayed by the application browser with a device used by a different user who is viewing the screen of the virtual space; and third display control processing for displaying, as shared information, information displayed by the application browser on a display object disposed in the virtual space.

[J] An information processing system comprising:

a first display controller that displays a first user interface element on a screen of a virtual space, the first user interface element being used for starting an application browser;

a starter that starts the application browser when an operation performed on the first user interface element by a user is received;

a second display controller that displays a second user interface element used for sharing information displayed by the application browser;

a sharing module that sends a sharing request to a server when an operation performed on the second user interface element by the user is received, the sharing request being a request to share information displayed by the application browser with a device used by a different user who is viewing the screen of the virtual space; and a third display controller that displays, as shared information, information displayed by the application browser on a display object disposed in the virtual space.

[K] A program causing one or more computers to function as:

a first display controller that displays a first user interface element on a screen of a virtual space, the first user interface element being used for starting a browser;

a starter that starts the browser when an operation performed on the first user interface element by a user is received;

a second display controller that displays a second user interface element used for sharing information displayed by the browser;

a sharing module that sends a sharing request to a server when an operation performed on the second user interface element by the user is received, the sharing request being a request to share information displayed by the browser with a device used by a different user who is viewing the screen of the virtual space; and a third display controller that displays, as shared information, information displayed by the browser on a display object disposed in the virtual space.

The browser includes at least one of an application browser and a web browser, which is installed separately from a program.

What is claimed is:

1. An information processing system, comprising:
processing circuitry configured to
display a first user interface element on a screen of a virtual space generated by a primary application, the first user interface element for starting an application browser integrated within or callable by the primary application;
start the application browser in a case that an operation is performed on the first user interface element by a user;
display a second user interface element which shares information displayed by the application browser;
send a sharing request to a server in a case that an operation is performed on the second user interface element by the user, the sharing request being a request to share information displayed by the application browser with a device used by a different user viewing the screen of the virtual space; and
display, as shared information, information displayed by the application browser on a three-dimensional display object, the three-dimensional display object being a digital signage, a screen, or a mobile body, and disposed in the virtual space, wherein
the shared information is displayed by projecting an image of a screen of the application browser onto the three-dimensional display object using texture mapping.

2. The information processing system according to claim 1, wherein in a case that an instruction based on a sharing request sent from the device used by the different user is received from the server, the processing circuitry displays information that the different user is sharing on the display object.

3. The information processing system according to claim 1, wherein the processing circuitry displays the shared information on all display objects disposed in the virtual space.

4. The information processing system program according to claim 1, wherein the processing circuitry is further configured to
select, among a plurality of display objects disposed in the virtual space, a display object that satisfies a display condition regarding a positional relationship with a position of the user in the virtual space; and
display the shared information on the selected display object.

5. The information processing system according to claim 1, wherein the processing circuitry is further configured to
display, in a case that an instruction based on a sharing request sent from the device used by the different user is received from the server, a third user interface element for selecting whether to start the application browser; and
display, in a case that an operation performed on the third user interface element to start the application browser is received, information that the different user is sharing by using the application browser.

6. The information processing system according to claim 5, wherein the third user interface element is displayed simultaneously with display of the shared information.

7. The information processing system according to claim 5, wherein the third user interface element is displayed before display of the shared information.

8. The information processing system according to claim 1, wherein the processing circuitry is further configured to
obtain web data linked with the first user interface element from a web server; and
display the obtained web data by using the application browser.

9. The information processing system according to claim 1, wherein the processing circuitry is further configured to display information, which is obtained as a result of inputting a search word into a search screen displayed by the application browser, on the display object as the shared information.

10. The information processing system according to claim 1, wherein the processing circuitry is further configured to display the first user interface element and the second user interface element only when the user is a streaming user to stream a video image of the virtual space.

11. The information processing system according to claim 1, wherein the application browser is a browser contained in an application for displaying the screen of the virtual space.

12. The information processing system according to claim 1, wherein the processing circuitry is further configured to generate the virtual space and to display the virtual space.

13. The information processing system according to claim 12, wherein the processing circuitry is further configured to generate the display object and display the display object in the virtual space.

14. The information processing system according to claim 1, wherein the processing circuitry is further configured to adjust display of the information according to a positional relationship between a position of the user in the virtual space and a position the display object.

15. The information processing system according to claim 1, wherein the processing circuitry is further configured to
select, among a plurality of display objects disposed in the virtual space, a display object that satisfies a display condition; and
display the shared information on the selected display object.

16. The information processing system according to claim 15, wherein the display condition relates to a height of the display object.

17. The information processing system according to claim 15, wherein the display condition relates to a color of the display object.

18. The information processing system according to claim 15, wherein the display condition relates to an effect of the display object.

19. An information processing method executed by one or more computers, the information processing method comprising:

displaying a first user interface element on a screen of a virtual space generated by a primary application, the first user interface element for starting an application browser integrated within or callable by the primary application;

starting the application browser in a case that an operation is performed on the first user interface element by a user;

displaying a second user interface element which shares information displayed by the application browser;

sending a sharing request to a server in a case that an operation is performed on the second user interface element by the user, the sharing request being a request to share information displayed by the application browser with a device used by a different user viewing the screen of the virtual space; and displaying, as shared information, information displayed by the application browser on a three-dimensional display object, the three-dimensional display object being a digital signage, a screen, or a mobile body, and disposed in the virtual space, wherein the shared information is displayed by projecting an image of a screen of the application browser onto the three-dimensional display object using texture mapping.

20. A non-transitory computer readable medium storing computer executable instructions which, when executed by one or more processors of a computer, cause the computer to perform a process comprising:

displaying a first user interface element on a screen of a virtual space generated by a primary application, the first user interface element for starting an application browser integrated within or callable by the primary application;

starting the application browser in a case that an operation is performed on the first user interface element by a user;

displaying a second user interface element which shares information displayed by the application browser;

sending a sharing request to a server in a case that an operation is performed on the second user interface element by the user, the sharing request being a request to share information displayed by the application browser with a device used by a different user viewing the screen of the virtual space; and displaying, as shared information, information displayed by the application browser on a three-dimensional display object, the three-dimensional display object being a digital signage, a screen, or a mobile body, and disposed in the virtual space, wherein the shared information is displayed by projecting an image of a screen of the application browser onto the three-dimensional display object using texture mapping.

\* \* \* \* \*